US012705570B2

(12) United States Patent
Kim et al.

(10) Patent No.: US 12,705,570 B2
(45) Date of Patent: Aug. 11, 2026

(54) DEVICES AND METHODS FOR COMPUTER VISION GUIDED PLANOGRAM GENERATION

(71) Applicant: ZEBRA TECHNOLOGIES CORPORATION, Lincolnshire, IL (US)

(72) Inventors: Eunhyang Kim, London (GB); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 584 days.

(21) Appl. No.: 17/976,219

(22) Filed: Oct. 28, 2022

(65) Prior Publication Data

US 2024/0144170 A1 May 2, 2024

(51) Int. Cl.
*G06Q 10/087* (2023.01)
*G06V 20/50* (2022.01)

(52) U.S. Cl.
CPC .......... *G06Q 10/087* (2013.01); *G06V 20/50* (2022.01)

(58) Field of Classification Search
CPC .. G06Q 30/0643; G06Q 10/087; G06Q 30/02; G06Q 10/06393; G06Q 30/0208; G06Q 30/0631; G06Q 50/04; G06Q 10/04; G06Q 10/0635; G06Q 10/06395; G06Q 10/10; G06Q 50/06; G06Q 99/00; G06Q 10/0633; G06Q 10/0637; G06Q 10/067; G06Q 10/103; G06Q 30/0263; G06Q 50/08; G06V 20/50; G06V 10/761; G06V 10/82;

(Continued)

(56) References Cited

U.S. PATENT DOCUMENTS 5,209,712 A 5/1993 Ferri
5,214,615 A 5/1993 Bauer (Continued)

FOREIGN PATENT DOCUMENTS

CA 2835830 11/2012
CA 3028156 1/2018

(Continued)

OTHER PUBLICATIONS

Lecking et al: "Localization in a wide range of industrial environments using relative 3D ceiling features", IEEE, pp. 333-337 (Sep. 15, 2008).

(Continued)

*Primary Examiner* — Florian M Zeender
*Assistant Examiner* — Vanessa Deligi

(57) ABSTRACT

Devices and methods for planogram generation are disclosed herein. The method detects at least one first item and at least one label present in a captured image and associates the at least one first item with the at least one label based on a boundary between the at least one first item and at least one second item different from the at least one first item. The method identifies the at least one first item based on at least one attribute of the at least one first item and determines an area indicative of a position of the identified at least one first item based on the association. The area can be one or more of an aisle, a module, a shelf, a rack, a bay, and a bin. The method generates a planogram based on the association, the identified at least one first item and the area.

21 Claims, 15 Drawing Sheets

(58) Field of Classification Search
CPC .. G06V 10/764; G06V 10/806; G06V 10/774; G06V 10/40; G06V 10/25; G06V 10/44; G06V 10/454; G06V 20/52; G06V 10/75; G06V 10/7715; G06V 10/26; G06V 30/412; G06V 10/42; G06V 10/762; G06V 10/765; G06V 20/70; G06V 40/172; G06V 10/52; G06V 10/56; G06V 20/20; G06V 20/17; G06V 2201/03; G06V 40/168; G06V 20/46; G06V 2201/07; G06V 10/50; G06V 10/54; G06V 10/763; G06V 20/64
See application file for complete search history.

(56) References Cited

U.S. PATENT DOCUMENTS 5,408,322 A 4/1995 Hsu et al.
5,414,268 A 5/1995 McGee
5,423,617 A 6/1995 Marsh et al.
5,534,762 A 7/1996 Kim
5,566,280 A 10/1996 Fukui et al.
5,704,049 A 12/1997 Briechle
5,953,055 A 9/1999 Huang et al.
5,988,862 A 11/1999 Kacyra et al.
6,026,376 A 2/2000 Kenney
6,034,379 A 3/2000 Bunte et al.
6,075,905 A 6/2000 Herman et al.
6,115,114 A 9/2000 Berg et al.
6,141,293 A 10/2000 Amorai-Moriya et al.
6,304,855 B1 10/2001 Burke
6,442,507 B1 8/2002 Skidmore et al.
6,549,825 B2 4/2003 Kurata
6,580,441 B2 6/2003 Schileru-Key
6,711,293 B1 3/2004 Lowe
6,721,723 B1 4/2004 Gibson et al.
6,721,769 B1 4/2004 Rappaport et al.
6,836,567 B1 12/2004 Silver et al.
6,995,762 B1 2/2006 Pavlidis et al.
7,090,135 B2 8/2006 Patel
7,137,207 B2 11/2006 Armstrong et al.
7,245,558 B2 7/2007 Willins et al.
7,248,754 B2 7/2007 Cato
7,277,187 B2 10/2007 Smith et al.
7,373,722 B2 5/2008 Cooper et al.
7,474,389 B2 1/2009 Greenberg et al.
7,487,595 B2 2/2009 Armstrong et al.
7,493,336 B2 2/2009 Noonan
7,508,794 B2 3/2009 Feather et al.
7,527,205 B2 5/2009 Zhu et al.
7,605,817 B2 10/2009 Zhang et al.
7,647,752 B2 1/2010 Magnell
7,693,757 B2 4/2010 Zimmerman
7,726,575 B2 6/2010 Wang et al.
7,751,928 B1 7/2010 Antony et al.
7,783,383 B2 8/2010 Eliuk et al.
7,839,531 B2 11/2010 Sugiyama
7,845,560 B2 12/2010 Emanuel et al.
7,885,865 B2 2/2011 Benson et al.
7,925,114 B2 4/2011 Mai et al.
7,957,998 B2 6/2011 Riley et al.
7,996,179 B2 8/2011 Lee et al.
8,009,864 B2 8/2011 Linaker et al.
8,049,621 B1 11/2011 Egan
8,091,782 B2 1/2012 Cato et al.
8,094,902 B2 1/2012 Crandall et al.
8,094,937 B2 1/2012 Teoh et al.
8,132,728 B2 3/2012 Dwinell et al.
8,134,717 B2 3/2012 Pangrazio et al.
8,189,855 B2 5/2012 Opalach et al.
8,199,977 B2 6/2012 Krishnaswamy et al.
8,207,964 B1 6/2012 Meadow et al.
8,233,055 B2 7/2012 Matsunaga et al.
8,260,742 B2 9/2012 Cognigni et al.
8,265,895 B2 9/2012 Willins et al.
8,277,396 B2 10/2012 Scott et al.
8,284,988 B2 10/2012 Sones et al.
8,423,431 B1 4/2013 Rouaix et al.
8,429,004 B2 4/2013 Hamilton et al.
8,463,079 B2 6/2013 Ackley et al.
8,479,996 B2 7/2013 Barkan et al.
8,520,067 B2 8/2013 Ersue
8,542,252 B2 9/2013 Perez et al.
8,571,314 B2 10/2013 Tao et al.
8,599,303 B2 12/2013 Stettner
8,630,924 B2 1/2014 Groenevelt et al.
8,660,338 B2 2/2014 Ma et al.
8,743,176 B2 6/2014 Stettner et al.
8,757,479 B2 6/2014 Clark et al.
8,812,226 B2 8/2014 Zeng
8,923,893 B2 12/2014 Austin et al.
8,939,369 B2 1/2015 Olmstead et al.
8,954,188 B2 2/2015 Sullivan et al.
8,958,911 B2 2/2015 Wong et al.
8,971,637 B1 3/2015 Rivard
8,989,342 B2 3/2015 Liesenfelt et al.
9,007,601 B2 4/2015 Steffey et al.
9,037,287 B1 5/2015 Grauberger et al.
9,064,394 B1 6/2015 Trundle
9,070,285 B1 6/2015 Ramu et al.
9,072,929 B1 7/2015 Rush et al.
9,120,622 B1 9/2015 Elazary et al.
9,129,277 B2 9/2015 Macintosh
9,135,491 B2 9/2015 Morandi et al.
9,159,047 B2 10/2015 Winkel
9,171,442 B2 10/2015 Clements
9,247,211 B2 1/2016 Zhang et al.
9,329,269 B2 5/2016 Zeng
9,349,076 B1 5/2016 Liu et al.
9,367,831 B1 6/2016 Besehanic
9,380,222 B2 6/2016 Clayton et al.
9,396,554 B2 7/2016 Williams et al.
9,400,170 B2 7/2016 Steffey
9,424,482 B2 8/2016 Patel et al.
9,517,767 B1 12/2016 Kentley et al.
9,542,746 B2 1/2017 Wu et al.
9,547,838 B2 1/2017 Larsen
9,549,125 B1 1/2017 Goyal et al.
9,562,971 B2 2/2017 Shenkar et al.
9,565,400 B1 2/2017 Curlander et al.
9,589,353 B2 3/2017 Mueller-Fischer et al.
9,600,731 B2 3/2017 Yasunaga et al.
9,600,892 B2 3/2017 Patel et al.
9,612,123 B1 4/2017 Levinson et al.
9,639,935 B1 5/2017 Douady-Pleven et al.
9,697,429 B2 7/2017 Patel et al.
9,766,074 B2 9/2017 Roumeliotis et al.
9,778,388 B1 10/2017 Connor
9,779,205 B2 10/2017 Namir
9,791,862 B1 10/2017 Connor
9,805,240 B1 10/2017 Zheng et al.
9,811,754 B2 11/2017 Schwartz
9,827,683 B1 11/2017 Hance et al.
9,880,009 B2 1/2018 Bell
9,928,708 B2 3/2018 Lin et al.
9,953,420 B2 4/2018 Wolski et al.
9,980,009 B2 5/2018 Jiang et al.
9,994,339 B2 6/2018 Colson et al.
9,996,818 B1 6/2018 Ren et al.
10,007,964 B1 * 6/2018 Calhoon .................. G06T 3/40
10,019,803 B2 7/2018 Venable et al.
10,111,646 B2 10/2018 Nycz et al.
10,121,072 B1 11/2018 Kekatpure
10,127,438 B1 11/2018 Fisher et al.
10,133,951 B1 11/2018 Mendonca et al.
10,197,400 B2 2/2019 Jesudason et al.
10,210,603 B2 2/2019 Venable et al.
10,229,386 B2 3/2019 Thomas
10,248,653 B2 4/2019 Blassin et al.
10,262,294 B1 4/2019 Hahn et al.
10,265,871 B2 4/2019 Hance et al.
10,289,990 B2 5/2019 Rizzolo et al.
10,336,543 B1 7/2019 Sills et al.
10,349,031 B2 7/2019 DeLuca

(56) References Cited

U.S. PATENT DOCUMENTS 10,352,689 B2 7/2019 Brown et al.
10,373,116 B2 8/2019 Medina et al.
10,394,244 B2 8/2019 Song et al.
10,429,487 B1 10/2019 Fowe
11,003,188 B2 5/2021 Scott et al.
2001/0031069 A1 10/2001 Kondo et al.
2001/0041948 A1 11/2001 Ross et al.
2002/0006231 A1 1/2002 Jayant et al.
2002/0059202 A1 5/2002 Hadzikadic et al.
2002/0097439 A1 7/2002 Braica
2002/0146170 A1 10/2002 Rom
2002/0158453 A1 10/2002 Levine
2002/0164236 A1 11/2002 Fukuhara et al.
2003/0003925 A1 1/2003 Suzuki
2003/0094494 A1 5/2003 Blanford et al.
2003/0174891 A1 9/2003 Wenzel et al.
2004/0021313 A1 2/2004 Gardner et al.
2004/0084527 A1 5/2004 Bong et al.
2004/0131278 A1 7/2004 Imagawa et al.
2004/0240754 A1 12/2004 Smith et al.
2005/0016004 A1 1/2005 Armstrong et al.
2005/0114059 A1 5/2005 Chang et al.
2005/0128195 A1 6/2005 Houston et al.
2005/0174351 A1 8/2005 Chang
2005/0213082 A1 9/2005 DiBernardo et al.
2005/0213109 A1 9/2005 Schell et al.
2005/0237320 A1 10/2005 Itoh et al.
2006/0032915 A1 2/2006 Schwartz
2006/0045325 A1 3/2006 Zavadsky et al.
2006/0064286 A1 3/2006 Fink et al.
2006/0078224 A1 4/2006 Hirosawa
2006/0106742 A1 5/2006 Bochicchio et al.
2006/0279527 A1 12/2006 Zehner et al.
2006/0285486 A1 12/2006 Roberts et al.
2007/0036398 A1 2/2007 Chen
2007/0074410 A1 4/2007 Armstrong et al.
2007/0272732 A1 11/2007 Hindmon
2008/0002866 A1 1/2008 Fujiwara
2008/0025565 A1 1/2008 Zhang et al.
2008/0027591 A1 1/2008 Lenser et al.
2008/0077511 A1 3/2008 Zimmerman
2008/0159634 A1 7/2008 Sharma et al.
2008/0164310 A1 7/2008 Dupuy et al.
2008/0175513 A1 7/2008 Lai et al.
2008/0181529 A1 7/2008 Michel et al.
2008/0183730 A1 7/2008 Enga
2008/0238919 A1 10/2008 Pack
2008/0294487 A1 11/2008 Nasser
2009/0009123 A1 1/2009 Skaff
2009/0024353 A1 1/2009 Lee et al.
2009/0057411 A1 3/2009 Madej et al.
2009/0059270 A1 3/2009 Opalach et al.
2009/0060349 A1 3/2009 Linaker et al.
2009/0063306 A1 3/2009 Fano et al.
2009/0063307 A1 3/2009 Groenovelt et al.
2009/0074303 A1 3/2009 Filimonova et al.
2009/0088975 A1 4/2009 Sato et al.
2009/0103773 A1 4/2009 Wheeler et al.
2009/0125350 A1 5/2009 Lessing et al.
2009/0125535 A1 5/2009 Basso et al.
2009/0152391 A1 6/2009 McWhirk
2009/0160975 A1 6/2009 Kwan
2009/0192921 A1 7/2009 Hicks
2009/0206161 A1 8/2009 Olmstead
2009/0236155 A1 9/2009 Skaff
2009/0252437 A1 10/2009 Li et al.
2009/0287587 A1 11/2009 Bloebaum et al.
2009/0323121 A1 12/2009 Valkenburg et al.
2010/0017407 A1 1/2010 Beniyama et al.
2010/0026804 A1 2/2010 Tanizaki et al.
2010/0070365 A1 3/2010 Siotia et al.
2010/0082194 A1 4/2010 Yabushita et al.
2010/0091094 A1 4/2010 Sekowski
2010/0118116 A1 5/2010 Tomasz et al.
2010/0131234 A1 5/2010 Stewart et al.
2010/0141806 A1 6/2010 Uemura et al.
2010/0161569 A1 6/2010 Schreter
2010/0171826 A1 7/2010 Hamilton et al.
2010/0208039 A1 8/2010 Setettner
2010/0214873 A1 8/2010 Somasundaram et al.
2010/0235033 A1 9/2010 Yamamoto et al.
2010/0241289 A1 9/2010 Sandberg
2010/0257149 A1 10/2010 Cognigni et al.
2010/0295850 A1 11/2010 Katz et al.
2010/0315412 A1 12/2010 Sinha et al.
2010/0326939 A1 12/2010 Clark et al.
2011/0047636 A1 2/2011 Stachon et al.
2011/0052043 A1 3/2011 Hyung et al.
2011/0093306 A1 4/2011 Nielsen et al.
2011/0137527 A1 6/2011 Simon et al.
2011/0168774 A1 7/2011 Magal
2011/0172875 A1 7/2011 Gibbs
2011/0188759 A1 8/2011 Filimonova et al.
2011/0216063 A1 9/2011 Hayes
2011/0242286 A1 10/2011 Pace et al.
2011/0246503 A1 10/2011 Bender et al.
2011/0254840 A1 10/2011 Halstead
2011/0286007 A1 11/2011 Pangrazio et al.
2011/0288816 A1 11/2011 Thierman
2011/0310088 A1 12/2011 Adabala et al.
2012/0017028 A1 1/2012 Tsirkin
2012/0019393 A1 1/2012 Wolinsky et al.
2012/0022913 A1 1/2012 VolKmann et al.
2012/0051730 A1 3/2012 Cote et al.
2012/0069051 A1 3/2012 Hagbi et al.
2012/0075342 A1 3/2012 Choubassi et al.
2012/0133639 A1 5/2012 Kopf et al.
2012/0169530 A1 7/2012 Padmanabhan et al.
2012/0179621 A1 7/2012 Moir et al.
2012/0185112 A1 7/2012 Sung et al.
2012/0194644 A1 8/2012 Newcombe et al.
2012/0197464 A1 8/2012 Wang et al.
2012/0201466 A1 8/2012 Funayama et al.
2012/0209553 A1 8/2012 Doytchinov et al.
2012/0236119 A1 9/2012 Rhee et al.
2012/0249802 A1 10/2012 Taylor
2012/0250978 A1 10/2012 Taylor
2012/0269383 A1 10/2012 Bobbitt et al.
2012/0278782 A1 11/2012 Pal et al.
2012/0287249 A1 11/2012 Choo et al.
2012/0307108 A1 12/2012 Forutanpour
2012/0323620 A1 12/2012 Hofman et al.
2013/0030700 A1 1/2013 Miller et al.
2013/0076586 A1 3/2013 Karhuketo et al.
2013/0090881 A1 4/2013 Janardhanan et al.
2013/0119138 A1 5/2013 Winkel
2013/0132913 A1 5/2013 Fu et al.
2013/0134178 A1 5/2013 Lu
2013/0138246 A1 5/2013 Gutmann et al.
2013/0138534 A1 5/2013 Herwig
2013/0142421 A1 6/2013 Silver et al.
2013/0144565 A1 6/2013 Miller
2013/0154802 A1 6/2013 O'Haire et al.
2013/0156292 A1 6/2013 Chang et al.
2013/0162806 A1 6/2013 Ding et al.
2013/0169681 A1 7/2013 Rasane et al.
2013/0176398 A1 7/2013 Bonner et al.
2013/0178227 A1 7/2013 Vartanian et al.
2013/0182114 A1 7/2013 Zhang et al.
2013/0226344 A1 8/2013 Wong et al.
2013/0228620 A1 9/2013 Ahem et al.
2013/0232039 A1 9/2013 Jackson et al.
2013/0235165 A1 9/2013 Gharib et al.
2013/0235206 A1 9/2013 Smith et al.
2013/0236089 A1 9/2013 Litvak et al.
2013/0278631 A1 10/2013 Border et al.
2013/0299306 A1 11/2013 Jiang et al.
2013/0299313 A1 11/2013 Baek, IV et al.
2013/0300729 A1 11/2013 Grimaud
2013/0303193 A1 11/2013 Dharwada et al.
2013/0321418 A1 12/2013 Kirk
2013/0329013 A1 12/2013 Metois et al.
2013/0341400 A1 12/2013 Lancaster-Larocque
2013/0342363 A1 12/2013 Paek et al.

(56) References Cited

U.S. PATENT DOCUMENTS

2014/0002597 A1 1/2014 Taguchi et al.
2014/0003655 A1 1/2014 Gopalkrishnan et al.
2014/0003727 A1 1/2014 Lortz et al.
2014/0006229 A1 1/2014 Birch et al.
2014/0016832 A1 1/2014 Kong et al.
2014/0019311 A1 1/2014 Tanaka
2014/0025201 A1 1/2014 Ryu et al.
2014/0028837 A1 1/2014 Gao et al.
2014/0047342 A1 2/2014 Breternitz et al.
2014/0049616 A1 2/2014 Stettner
2014/0052555 A1 2/2014 MacIntosh
2014/0086483 A1 3/2014 Zhang et al.
2014/0088761 A1 3/2014 Shamlian et al.
2014/0098094 A1 4/2014 Neumann et al.
2014/0100813 A1 4/2014 Shaowering
2014/0104413 A1 4/2014 McCloskey et al.
2014/0112537 A1 4/2014 Frank et al.
2014/0129027 A1 5/2014 Schnittman
2014/0133740 A1 5/2014 Plagemann et al.
2014/0156133 A1 6/2014 Cullinane et al.
2014/0161359 A1 6/2014 Magri et al.
2014/0192050 A1 7/2014 Qiu et al.
2014/0195095 A1 7/2014 Flohr et al.
2014/0195374 A1 7/2014 Bassemir et al.
2014/0214547 A1 7/2014 Signorelli et al.
2014/0214600 A1 7/2014 Argue et al.
2014/0267614 A1 9/2014 Ding et al.
2014/0267688 A1 9/2014 Aich et al.
2014/0277691 A1 9/2014 Jacobus et al.
2014/0277692 A1 9/2014 Buzan et al.
2014/0279294 A1 9/2014 Field-Darragh et al.
2014/0300637 A1 10/2014 Fan et al.
2014/0316875 A1 10/2014 Tkachenko et al.
2014/0330835 A1 11/2014 Boyer
2014/0344401 A1 11/2014 Varney et al.
2014/0351073 A1 11/2014 Murphy et al.
2014/0369607 A1 12/2014 Patel et al.
2015/0015602 A1 1/2015 Beaudoin
2015/0016712 A1 1/2015 Rhoads et al.
2015/0019391 A1 1/2015 Kumar et al.
2015/0029339 A1 1/2015 Kobres et al.
2015/0032304 A1 1/2015 Nakamura et al.
2015/0039458 A1 2/2015 Reid
2015/0052029 A1 2/2015 Wu et al.
2015/0088618 A1 3/2015 Basir et al.
2015/0088701 A1 3/2015 Desmarais et al.
2015/0088703 A1 3/2015 Yan
2015/0092066 A1 4/2015 Geiss et al.
2015/0106403 A1 4/2015 Haverinen et al.
2015/0117788 A1 4/2015 Patel et al.
2015/0139010 A1 5/2015 Jeong et al.
2015/0154467 A1 6/2015 Feng et al.
2015/0161793 A1 6/2015 Takahashi
2015/0170256 A1 6/2015 Pettyjohn et al.
2015/0181198 A1 6/2015 Baele et al.
2015/0195491 A1 7/2015 Shaburov et al.
2015/0212521 A1 7/2015 Pack et al.
2015/0235157 A1 8/2015 Avegliano et al.
2015/0243073 A1 8/2015 Chen et al.
2015/0245358 A1 8/2015 Schmidt
2015/0262116 A1 9/2015 Katircioglu et al.
2015/0279035 A1 10/2015 Wolski et al.
2015/0298317 A1 10/2015 Wang et al.
2015/0310348 A1 10/2015 Dessouky et al.
2015/0310601 A1 10/2015 Rodriguez et al.
2015/0332368 A1 11/2015 Vartiainen et al.
2015/0352721 A1 12/2015 Wicks et al.
2015/0353280 A1 12/2015 Brazeau et al.
2015/0355639 A1 12/2015 Versteeg et al.
2015/0363625 A1 12/2015 Wu et al.
2015/0363758 A1 12/2015 Wu et al.
2015/0365660 A1 12/2015 Wu et al.
2015/0379704 A1 12/2015 Chandrasekar et al.
2016/0012588 A1 1/2016 Taguchi et al.
2016/0026253 A1 1/2016 Bradski et al.
2016/0042223 A1 2/2016 Suh et al.
2016/0044862 A1 2/2016 Kocer
2016/0061591 A1 3/2016 Pangrazio et al.
2016/0070981 A1 3/2016 Sasaki et al.
2016/0092943 A1 3/2016 Vigier et al.
2016/0104041 A1 4/2016 Bowers et al.
2016/0107690 A1 4/2016 Oyama et al.
2016/0112628 A1 4/2016 Super et al.
2016/0114488 A1 4/2016 Mascorro Medina et al.
2016/0129592 A1 5/2016 Saboo et al.
2016/0132815 A1 5/2016 Itoko et al.
2016/0150217 A1 5/2016 Popov
2016/0156898 A1 6/2016 Ren et al.
2016/0163067 A1 6/2016 Williams et al.
2016/0171336 A1 6/2016 Schwartz
2016/0171429 A1 6/2016 Schwartz
2016/0171707 A1 6/2016 Schwartz
2016/0185347 A1 6/2016 Lefevre et al.
2016/0191759 A1 6/2016 Somanath et al.
2016/0224927 A1 8/2016 Pettersson
2016/0253735 A1 9/2016 Scudillo et al.
2016/0253844 A1 9/2016 Petrovskaya et al.
2016/0259329 A1 9/2016 High et al.
2016/0260051 A1 9/2016 Wu et al.
2016/0260054 A1 9/2016 High et al.
2016/0271795 A1 9/2016 Vicenti
2016/0290805 A1 10/2016 Irish et al.
2016/0313133 A1 10/2016 Zeng et al.
2016/0328618 A1 11/2016 Patel et al.
2016/0328767 A1 11/2016 Bonner et al.
2016/0353099 A1 12/2016 Thomson et al.
2016/0364634 A1 12/2016 Davis et al.
2016/0375592 A1 12/2016 Szatmary Botond et al.
2017/0004649 A1 1/2017 Collet Romea et al.
2017/0011281 A1 1/2017 Dijkman et al.
2017/0011308 A1 1/2017 Sun et al.
2017/0030538 A1 2/2017 Geisler et al.
2017/0032311 A1 2/2017 Rizzolo et al.
2017/0041553 A1 2/2017 Cao et al.
2017/0054965 A1 2/2017 Raab et al.
2017/0066459 A1 3/2017 Singh
2017/0074659 A1 3/2017 Giurgiu et al.
2017/0083774 A1 3/2017 Solar et al.
2017/0084037 A1 3/2017 Barajas Hernandez et al.
2017/0109940 A1 4/2017 Guo et al.
2017/0147966 A1 5/2017 Aversa et al.
2017/0150129 A1 5/2017 Pangrazio
2017/0178060 A1 6/2017 Schwartz
2017/0178227 A1 6/2017 Gornish
2017/0178301 A1 6/2017 Moraleda et al.
2017/0178310 A1* 6/2017 Gormish .................. G06T 7/30
2017/0193434 A1 7/2017 Shah et al.
2017/0205892 A1 7/2017 Petrovskaya et al.
2017/0219338 A1 8/2017 Brown et al.
2017/0219353 A1 8/2017 Alesiani
2017/0227645 A1 8/2017 Swope et al.
2017/0227647 A1 8/2017 Baik
2017/0228885 A1 8/2017 Baumgartner
2017/0261993 A1 9/2017 Venable et al.
2017/0262724 A1 9/2017 Wu et al.
2017/0280125 A1 9/2017 Brown et al.
2017/0286773 A1 10/2017 Skaff et al.
2017/0286901 A1 10/2017 Skaff et al.
2017/0297478 A1 10/2017 Sherman et al.
2017/0323253 A1 11/2017 Enssle et al.
2017/0323376 A1 11/2017 Glaser et al.
2017/0337508 A1 11/2017 Bogolea et al.
2017/0344016 A1 11/2017 Chen et al.
2018/0001481 A1 1/2018 Shah et al.
2018/0005035 A1 1/2018 Bogolea et al.
2018/0005176 A1 1/2018 Williams et al.
2018/0020145 A1 1/2018 Kotfis et al.
2018/0051991 A1 2/2018 Hong
2018/0053091 A1 2/2018 Savvides et al.
2018/0053305 A1 2/2018 Gu et al.
2018/0075403 A1 3/2018 Mascorro Medina et al.
2018/0089613 A1 3/2018 Chen et al.
2018/0101813 A1 4/2018 Paat et al.
2018/0107999 A1 4/2018 Rizzolo et al.

(56) References Cited

U.S. PATENT DOCUMENTS

2018/0108120 A1 4/2018 Venable et al.
2018/0108134 A1 4/2018 Venable et al.
2018/0114183 A1 4/2018 Howell
2018/0129201 A1 5/2018 Douglas et al.
2018/0130011 A1 5/2018 Jacobsson
2018/0143003 A1 5/2018 Clayton et al.
2018/0174325 A1 6/2018 Fu et al.
2018/0190160 A1 7/2018 Bryan et al.
2018/0197139 A1 7/2018 Hill
2018/0201423 A1 7/2018 Drzewiecki et al.
2018/0204111 A1 7/2018 Zadeh et al.
2018/0218218 A1 8/2018 Madan et al.
2018/0218494 A1* 8/2018 Chaubard ............ G06Q 10/087
2018/0251253 A1 9/2018 Taira et al.
2018/0260767 A1* 9/2018 Findlay ................ G06Q 10/087
2018/0276596 A1 9/2018 Murthy et al.
2018/0281191 A1 10/2018 Sinyavskiy et al.
2018/0293442 A1 10/2018 Fridental et al.
2018/0293543 A1 10/2018 Tiwari
2018/0306958 A1 10/2018 Goss et al.
2018/0313956 A1 11/2018 Rzeszutek et al.
2018/0314260 A1 11/2018 Jen et al.
2018/0314908 A1 11/2018 Lam
2018/0315007 A1 11/2018 Kingsford et al.
2018/0315065 A1 11/2018 Zhang et al.
2018/0315173 A1 11/2018 Phan et al.
2018/0315865 A1 11/2018 Haist et al.
2018/0321692 A1 11/2018 Castillo-Effen et al.
2018/0370727 A1 12/2018 Hance et al.
2019/0025838 A1 1/2019 Artes et al.
2019/0034854 A1 1/2019 Borodow et al.
2019/0049962 A1 2/2019 Ouellette et al.
2019/0057588 A1 2/2019 Savvides et al.
2019/0065861 A1 2/2019 Savvides et al.
2019/0073554 A1 3/2019 Rzeszutek
2019/0073559 A1 3/2019 Rzeszutek et al.
2019/0073627 A1 3/2019 Nakdimon et al.
2019/0077015 A1 3/2019 Shibasaki et al.
2019/0087663 A1 3/2019 Yamazaki et al.
2019/0094876 A1 3/2019 Moore et al.
2019/0108606 A1 4/2019 Komiyama
2019/0108678 A1 4/2019 Hazeghi et al.
2019/0160675 A1 5/2019 Paschall, II et al.
2019/0178436 A1 6/2019 Mao et al.
2019/0180150 A1 6/2019 Taylor et al.
2019/0197439 A1 6/2019 Wang
2019/0197728 A1 6/2019 Yamao
2019/0236530 A1 8/2019 Cantrell et al.
2019/0271984 A1 9/2019 Kingsford
2019/0304132 A1 10/2019 Yoda et al.
2019/0359300 A1 11/2019 Johnson et al.
2019/0392212 A1 12/2019 Sawhney et al.
2019/0392506 A1 12/2019 Bogolea et al.
2020/0005225 A1* 1/2020 Chaubard ............ G06Q 10/087
2020/0049511 A1 2/2020 Sithiravel et al.
2020/0053325 A1 2/2020 Deyle et al.
2020/0064483 A1 2/2020 Li et al.
2020/0068126 A1 2/2020 Fink et al.
2020/0111267 A1 4/2020 Stauber et al.
2020/0118064 A1 4/2020 Perrella et al.
2020/0150655 A1 5/2020 Artes et al.
2020/0192388 A1 6/2020 Zhang et al.
2020/0215698 A1* 7/2020 Bogolea ................. B25J 11/008
2020/0314333 A1 10/2020 Liang et al.
2020/0341151 A1 10/2020 Yoshida
2020/0394599 A1* 12/2020 Akatsuka .............. G06Q 30/06
2020/0410766 A1 12/2020 Swaminathan
2021/0019939 A1 1/2021 Hu et al.
2021/0146552 A1 5/2021 Hong et al.
2021/0163068 A1 6/2021 Zhu et al.
2021/0233305 A1 7/2021 Garcia et al.
2021/0248547 A1* 8/2021 Bizoara ................ G06Q 30/018
2021/0271238 A1 9/2021 Ko et al.
2022/0309448 A1* 9/2022 Bahirat ................... G06F 18/21
2022/0383248 A1* 12/2022 Bahirat ................ G06Q 10/087
2023/0274227 A1* 8/2023 Eggert ................. G06Q 10/087 705/28
2023/0376893 A1* 11/2023 Bogolea ............... G06Q 10/087
2024/0212322 A1* 6/2024 Bennet ................. G06V 10/764

FOREIGN PATENT DOCUMENTS

CN 101809601 8/2008
CN 102214343 10/2011
CN 104200086 12/2014
CN 105701519 12/2015
CN 105989512 10/2016
CN 107067382 8/2017
CN 206952978 2/2018
EP 766098 4/1997
EP 1311993 5/2007
EP 2309378 4/2011
EP 2439487 4/2012
EP 2472475 7/2012
EP 2562688 2/2013
EP 2662831 11/2013
EP 2693362 2/2014
EP 3400113 11/2018
FR 3001567 8/2014
GB 2323238 9/1998
GB 2330265 4/1999
JP 2014170431 9/2014
JP 2016194834 11/2016
JP 2017016539 1/2017
KR 101234798 1/2009
KR 1020190031431 3/2019
WO WO 99/23600 5/1999
WO WO 2003002935 1/2003
WO WO 2003025805 3/2003
WO WO 2006136958 12/2006
WO WO 2007042251 4/2007
WO WO 2008057504 5/2008
WO WO 2008154611 12/2008
WO WO 2012103199 8/2012
WO WO 2012103202 8/2012
WO WO 2012154801 11/2012
WO WO 2013165674 11/2013
WO WO 2014063157 4/2014
WO WO 2014066422 5/2014
WO WO 2014092552 6/2014
WO WO 2014181323 11/2014
WO WO 2015127246 8/2015
WO WO 2015127503 9/2015
WO WO 2016020038 2/2016
WO WO 2017175312 10/2017
WO WO 2017187106 11/2017
WO WO 2017201483 11/2017
WO WO 2018018007 1/2018
WO WO 2018026631 2/2018
WO WO 2018204308 11/2018
WO WO 2018204342 11/2018
WO WO 2019023249 1/2019

OTHER PUBLICATIONS

Lee et al. "Statistically Optimized Sampling for Distributed Ray Tracing." ACM SIGGRAPH Computer Graphics, vol. 19, No. 3, ACM, pp. 61-67, 1985.

Li et al., "An improved RANSAC for 3D Point cloud plane segmentation based on normal distribution transformation cells," Remote sensing, V9: 433, pp. 1-16 (2017).

Likhachev, Maxim, and Dave Ferguson. "Planning Long dynamically feasible maneuvers for autonomous vehicles." The international journal of Robotics Reasearch 28.8 (2009): 933-945. (Year:2009).

Marder-Eppstein et al., "The Office Marathon: robust navigation in an indoor office environment," IEEE, 2010 International conference on robotics and automation, May 3- 7, 2010, pp. 300-307.

McNaughton, Matthew, et al. "Motion planning for autonomous driving with a conformal spatiotemporal lattice." Robotics and Automation (ICRA), 2011 IEEE International Conference on. IEEE, 2011. (Year: 2011).

(56) References Cited

OTHER PUBLICATIONS

Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 13/568,175 mailed on Sep. 23, 2014.
Notice of allowance for U.S. Appl. No. 13/693,503 mailed on Mar. 11, 2016.
Notice of allowance for U.S. Appl. No. 14/068,495 mailed on Apr. 25, 2016.
Notice of allowance for U.S. Appl. No. 14/518,091 mailed on Apr. 12, 2017.
Notice of allowance for U.S. Appl. No. 15/211,103 mailed on Apr. 5, 2017.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor Environments", IEEE/RSJ International Conference on Intelligent robots and Systems, Nov. 2013, pp. 176-181.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to incrementally register pairs of clouds," PCL Library, retrieved from internet on Aug. 22, 2016. [http://pointclouds.org/documentation/tutorials/pairwise_incremental_registration.php.
Rusu, et al. "Spatial Change detection on unorganized point cloud data," PCL Library, retrieved from internet on Aug. 19, 2016 [http://pointclouds.org/documentation/tutorials/octree_change.php].
Rusu, et al. "Towards 3D Point cloud based object maps for household environments," Science Direct, vol. 56, issue 11, pp. 927-947 [http://www.sciencedirect.com/science/article/pii/S0921889008001140]. Nov. 30, 2008. Retrieved from the internet on Jun. 15, 2022.
Schnabel et al. "Efficient RANSAC for Point-Cloud Shape Detection", vol. 0, No. 0, pp. 1-12 (1981).
Senthilkumaran, et al., "Edge Detection Techniques for Image Segmentation—A Survey of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visualization", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference On, IEEE, Piscataway, NJ pp. 3456-3459 (Aug. 23, 2010).
United Kingdom Intellectual Property Office, "Combined Search and Examination Report" for GB Patent Application No. 1813580.6 mailed on Feb. 21, 2019.
United Kingdom Intellectual Property Office, Combined Search and Examination Report mailed Jan. 22, 2016 for GB Patent Application No. 1417218.3.
United Kingdom Intellectual Property Office, Combined Search and Examination Report mailed Jan. 22, 2016 for GB Patent Application No. 1521272.3.
United Kingdom Intellectual Property Office, Combined Search and Examination Report mailed Mar. 11, 2015 for GB Patent Application No. 1417218.3.
United Kingdom Intellectual Property Office, Combined Search and Examination Report mailed May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Fan Zhang et al., "Parallax-tolerant Image Stitching", 2014 Computer Vision Foundation, pp. 4321-4328.
Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].
Julio Zaragoza et al., "As-Projective-As-Possible Image Stitching with Moving DLT", 2013 Computer Vision Foundation, pp. 2339-2346.
Zeng et al., Multi-view Self Supervised Deep Learning for 6D Pose Estimation in the Amazon Picking Challenge, May 7, 2017. Retrieved on Nov. 16, 2019 [https://arxiv.org/pdf/1609.09475.pdf].
Zhang et al., "Mobile computing and industrial augmented reality for real-time data access", Emerging Technologies and Factory Automation, 2001, 8th IEEE International Conference on Oct. 15-18, 2001, pp. 583-588, vol. 2.
Alshawabkeh et al., "Automatic Multi-Image Photo-Texturing of Complex 3D Scenes", CIPA 2005 XX International Symposium, (Sep. 26, 2005).
"Fair Billing with Automatic Dimensioning" pp. 1-4, undated, Copyright Mettler-Toledo International Inc.
"Plane Detection in Point Cloud Data" dated Jan. 25, 2010 by Michael Ying Yang and Wolfgang Forstner, Technical Report 1, 2010, University of Bonn.

(56) References Cited

OTHER PUBLICATIONS

"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Boden, "French retail chain to roll out NFC shelf edge labels to six hypermarkets" (Sep. 19, 2018), pp. 1-7.
Biswas et al. "Depth Camera Based Indoor Mobile Robot Localization and Navigation" Robotics and Automation (ICRA), 2012 IEEE International Conference on IEEE, 2012.
Bohm, Multi-Image Fusion for Occlusion-Free Façade Texturing, International Archives of the Photogrammetry, Remote Sensing and Spatial Information Sciences, pp. 867-872 (Jan. 2004).
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Castorena et al., "Autocalibration of lidar and optical cameras via edge alignment", 2016 IEEE International Conference on Acoustics, Speech and Signal Processing (Mar. 20, 2016).
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Clark, "Casino to open world's first NFC-enabled supermarket", (Sep. 19, 2018), pp. 1-7.
Clark, "Jogtek launches passive NFC shelf-edge labels", (Sep. 19, 2018), pp. 1-6.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing" ACM SIGGRAPH Computer Graphics, vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D Lidar point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Gruen et al., "Automatic Reconstruction and Visualization of a Complex Buddha Tower of Bayon, Cambodia" (Sep. 2001) [http:www.idb.arch.ethz.ch/files/konstanz_bayonpaper.pdf].
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 mailed on Apr. 2, 2014.
International Search Report and Written Opinion for International Patent Application No. PCT/US2013/053212 mailed on Dec. 1, 2014.
International Search Report and Written Opinion for corresponding International Patent Application No. PCT/US2016/064110 mailed on Mar. 20, 2017.
International Search Report and Written Opinion for corresponding International Patent Application No. PCT/US2017/024847 mailed on Jul. 7, 2017.
International Search Report and Written Opinion for International Application No. PCT/CN2017/083143 mailed on Feb. 11, 2018.
International Search Report and Written Opinion for International Application No. PCT/US2018/030419 mailed on Aug. 31, 2018.
International Search Report and Written Opinion from International Patent Application No. PCT/US2018/030345 mailed on Sep. 17, 2018.
International Search Report and Written Opinion from International Patent Application No. PCT/US2018/030360 mailed on Jul. 9, 2018.
International Search Report and Written Opinion from International Patent Application No. PCT/US2018/030363 mailed on Jul. 9, 2018.
International Search Report and Written Opinion for International Application No. PCT/US2019/025859 mailed on Jul. 3, 2019.
International Search Report and Written Opinion from International Patent Application No. PCT/US2019/025849 mailed on Jul. 9, 2019.
International Search Report and Written Opinion from International Patent Application No. PCT/US2019/049761 mailed on Nov. 15, 2019.
International Search Report and Written Opinion from International Patent Application No. PCT/US2019/051312 mailed on Nov. 15, 2019.
International Search Report and Written Opinion from International Patent Application No. PCT/US2019/054103 mailed on Jan. 6, 2020.
International Search Report and Written Opinion for International Patent Application No. PCT/US2019/057007 mailed on Jan. 14, 2020.
International Search Report and Written Opinion from International Patent Application No. PCT/US2019/064020 mailed on Feb. 19, 2020.
International Search Report and Written Opinion for International Patent Application No. PCT/US2020/027948 mailed on Jul. 16, 2020.
International Search Report and Written Opinion for International Patent Application No. PCT/US2020/028133 mailed on Jul. 24, 2020.

(56) References Cited

OTHER PUBLICATIONS

International Search Report and Written Opinion from International Patent Application No. PCT/US2020/029134 mailed on Jul. 27, 2020.

International Search Report and Written Opinion from International Patent Application No. PCT/US2020/028183 mailed on Jul. 24, 2020.

International Search Report and Written Opinion from International Patent Application No. PCT/US2020/035285 mailed on Aug. 27, 2020.

International Search Report and Written Opinion for International Patent Application No. PCT/US2021/024805 mailed on Aug. 2, 2021.

International Search Report and Written Opinion for International Patent Application No. PCT/US2021/057388 mailed on Feb. 2, 2022.

International Search Report and Written Opinion for International Patent Application No. PCT/IB2021/060948 mailed on Feb. 4, 2022.

International Search Report and Written Opinion for International Patent Application No. PCT/US2022/037723 mailed on Jul. 20, 2022.

Jadhav et al. "Survey on Spatial Domain dynamic template matching technique for scanning linear barcode," International Journal of science and research v 5 n 3, Mar. 2016)(Year: 2016).

Jian Fan et al: "Shelf detection via vanishing point and radial projection", 2014 IEEE International Conference on image processing (ICIP), IEEE, (Oct. 27, 2014), pp. 1575-1578.

Kaikai Liu et al., "Enabling Context-Aware Indoor Augmented Reality via Smartphone Sensing and Vision Tracking", ACM Transactions on Multimedia Computing Communications and Applications, Association for Computer Machinery, US, vol. 12, No. 15, pp. 1-23, Oct. 21, 2015.

Kang et al., "Kinematic Path-Tracking of Mobile Robot Using Iterative learning Control", Journal of Robotic Systems, 2005, pp. 111-121.

Kay et al. "Ray Tracing Complex Scenes." ACM SIGGRAPH Computer Graphics, vol. 20, no. 4, ACM, pp. 269-278, 1986.

Kelly et al., "Reactive Nonholonomic Trajectory Generation via Parametric Optimal Control", International Journal of Robotics Research, vol. 22, No. 7-8, pp. 583-601 (Jul. 30, 2013).

Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.

* cited by examiner

FIG. 1

Item 106-1 Compiled Result
498-1
498-2
498-3
498-4
498-5
496

Item Identifier

520

| A | E | F | G | H | I | J | L |
|---|---|---|---|---|---|---|---|
| Product Name | Aisle | Mod | Shelf | Shelf Position | Width Pckgs | Height Pckgs | Product SKU |
| Barilla Farfalle Pasta-16oz | 2 | 1 | 1 | 1 | 6 | 1 | 1 |
| Barilla Jumbo Shells-12oz (d) | 2 | 1 | 1 | 2 | 2 | 2 | 2 |
| Barilla Rotini Pasta-16oz | 2 | 1 | 2 | 1 | 3 | 1 | 3 |
| Barilla Penne Pasta-16oz | 2 | 1 | 2 | 2 | 3 | 1 | 4 |
| Barilla Elbow Macaroni Pasta-16oz | 2 | 1 | 2 | 3 | 3 | 1 | 5 |
| Banza Chickpea Pasta Spaghetti 8oz | 2 | 1 | 3 | 1 | 1 | 10 | 6 |
| Banza Chickpea Pasta Rigatoni 8oz | 2 | 1 | 3 | 2 | 3 | 1 | 7 |
| Banza Chickpea Pasta Penne 8oz | 2 | 1 | 3 | 3 | 2 | 1 | 8 |
| Banza Chickpea Pasta Rotini 8oz | 2 | 1 | 3 | 4 | 2 | 1 | 9 |
| Angel Hair Pasta-16oz-Market Pantry | 2 | 1 | 4 | 1 | 1 | 6 | 10 |
| Fettuccini Pasta-16oz-Market Pantry | 2 | 1 | 4 | 2 | 1 | 6 | 11 |
| Potato Gnocchi 17.6oz Archer Farms | 2 | 1 | 4 | 3 | 1 | 4 | 12 |

FIG. 13

DEVICES AND METHODS FOR COMPUTER VISION GUIDED PLANOGRAM GENERATION

BACKGROUND

An associate of a facility (e.g., a retail facility such as a grocery store, convenience store, big box store, etc.) can utilize a planogram to determine a location of each type of item in the facility. By interfacing with customers (e.g., customer service) and/or interacting with items and inventory (e.g., item returns and/or stocking), an associate can learn which items are sought and/or challenging to locate by customers, sell regularly, etc. Generally, a facility planogram is generated by a central entity (e.g., corporate headquarters). Therefore, a planogram may not be facility-specific. For example, the planogram may not reflect customer data (e.g., preferences and trends) and/or facility data (e.g., item returns, inventory, sales, etc.) and a facility may not have the required space (e.g., shelving) to accommodate each item listed on the planogram. As such, an associate may be required to generate a new planogram or modify an existing planogram to reflect customer data and/or facility data and/or accommodate each item. In addition, it can be challenging for an associate to transmit a generated or modified planogram in real-time to the central entity to optimize the generation of a facility-specific planogram.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a diagram illustrating an embodiment of a system of the present disclosure for planogram generation.

FIG. 13 is a table illustrating a planogram generated by an embodiment of the present disclosure.

Figure 2:
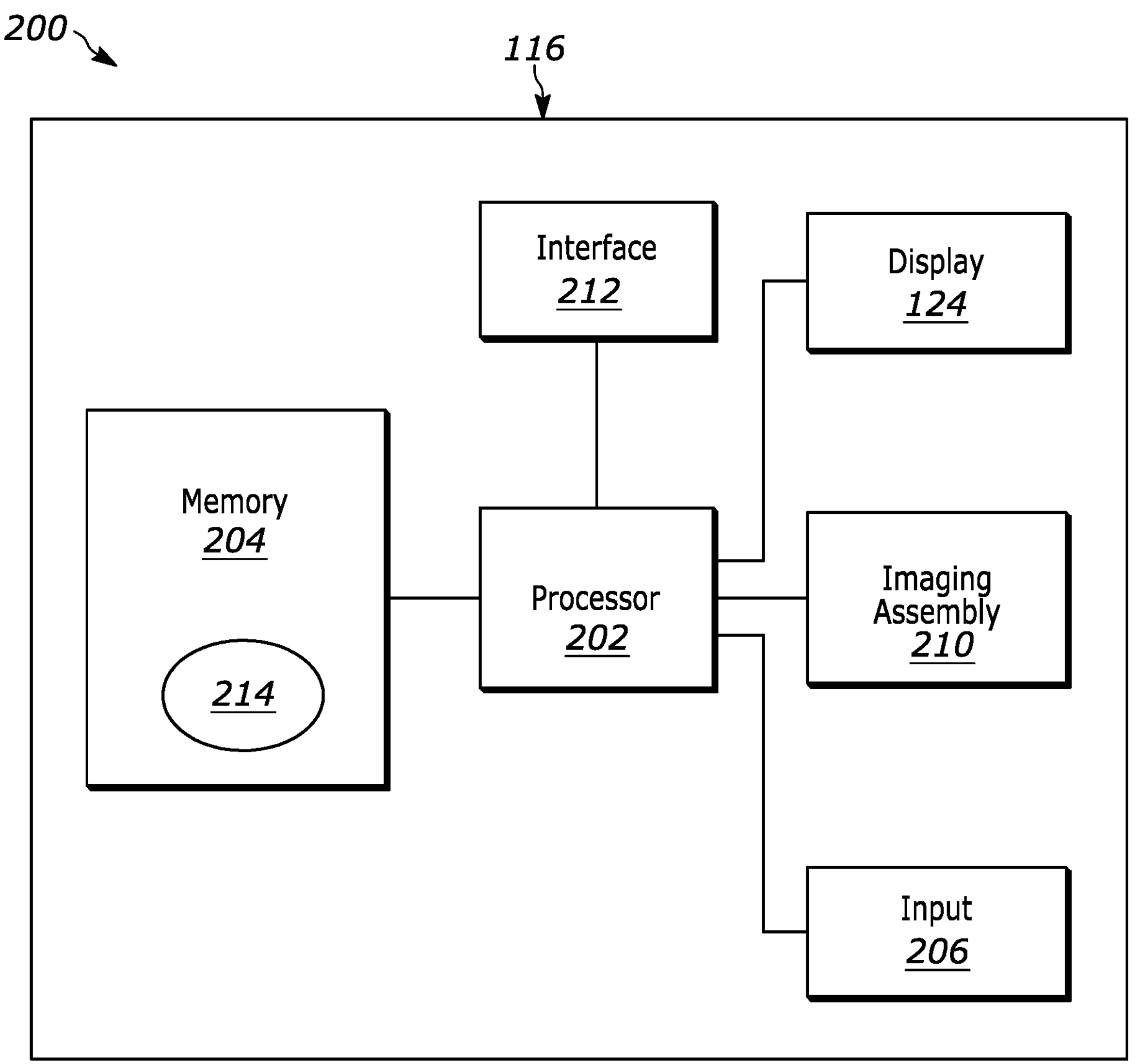
FIG. 2 is a diagram illustrating components of the computing device of FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As mentioned above, a facility planogram is generally generated by a central entity (e.g., corporate headquarters). Therefore, a planogram may not be facility-specific. For example, the planogram may not reflect customer data (e.g., preferences and trends) and/or facility data (e.g., item returns, inventory, sales, etc.) and a facility may not have the required space (e.g., shelving) to accommodate each item listed on the planogram. As such, an associate may be required to generate a new planogram or modify an existing planogram to reflect customer data and/or facility data and/or accommodate each item. Conventional planogram generation and/or modification systems can be manual (e.g., rely on human intervention) and, as such, can be time-consuming, cost-prohibitive (e.g., associate labor costs), and subject to human error. These systems can also require imaging systems (e.g., high-resolution camera systems) that are cost-prohibitive to deploy and utilize in a facility. In addition, it can be challenging for an associate to transmit a generated or modified planogram in real-time to the central entity to optimize the generation of a facility-specific planogram. For example, the planogram may be a modified hard copy such that the modified planogram may not readily be transmitted in real-time.

As such, conventional planogram systems suffer from a general lack of versatility because these systems cannot automatically and dynamically generate a planogram based on an association between at least one first item and at least one label, an identification (e.g., a stock keeping unit (SKU) and/or product code such as a universal product code (UPC)) of the at least one first item, and an area indicative of a position of the identified at least one first item. Overall, this lack of versatility causes conventional planogram systems to provide underwhelming performance and reduce the efficiency and general timeliness of generating and/or modifying and/or transmitting planograms. Thus, it is an objective of the present disclosure to eliminate these and other problems with conventional planogram systems and methods via systems and methods that can automatically and dynamically detect at least one first item and at least one label present in a captured image; associate the at least one first item with the at least one label based on a boundary between the at least one first item and at least one second item different from the at least one first item; identify the at least one first item based on at least one attribute of the at least one first item; determine an area indicative of a position of the identified at least one first item based on the association; and generate a planogram based on the association, the identified at least one first item and the area.

In accordance with the above, and with the disclosure herein, the present disclosure includes improvements in computer functionality or in improvements to other technologies at least because the present disclosure describes that, e.g., information systems, and their related various components, may be improved or enhanced with the disclosed dynamic system features and methods that provide more efficient workflows for workers and improved monitoring and management of planograms for system administrators. That is, the present disclosure describes improvements in the functioning of an information system itself or "any other technology or technical field" (e.g., the field of distributed and/or commercial information systems). For example, the disclosed dynamic system features and methods improve and enhance the generation and/or modification of planograms based on an association between at least one first item and at least one label, an identification (e.g., a SKU and/or product code such as a UPC) of the at least one first item, and an area indicative of a position of the identified at least one first item to mitigate (if not eliminate) worker error and eliminate inefficiencies typically experienced over time by systems lacking such features and methods. This improves the state of the art at least because such previous systems are inefficient as they lack the ability to automatically and dynamically generate and/or modify planograms and/or transmit these planograms in real-time to a central entity to optimize the generation of a facility-specific planogram.

In addition, the present disclosure applies various features and functionality, as described herein, with, or by use of, a particular machine, e.g., a processor, a mobile device (e.g., a tablet, a mobile computer, or wearable) and/or other hardware components as described herein. Moreover, the present disclosure includes specific features other than what is well-understood, routine, conventional activity in the field, or adding unconventional steps that demonstrate, in various embodiments, particular useful applications, e.g., determining an area indicative of a position of the identified at least one first item based on an association between at least one first item and at least one label in connection with generating a planogram. Accordingly, it would be highly beneficial to develop a system and method that can automatically and dynamically generate a planogram based on an association between at least one first item and at least one label, an identification (e.g., a SKU and/or product code such as a UPC) of the at least one first item, and an area indicative of a position of the identified at least one first item. The devices and methods of the present disclosure address these and other needs.

In an embodiment, the present disclosure is directed to a method for planogram generation. The method comprises detecting at least one first item and at least one label present in a captured image; associating the at least one first item with the at least one label based on a boundary between the at least one first item and at least one second item different from the at least one first item; identifying the at least one first item based on at least one attribute of the at least one first item; determining an area indicative of a position of the identified at least one first item based on the association; and generating a planogram based on the association, the identified at least one first item and the area.

In an embodiment, the present disclosure is directed to a device for planogram generation. The device comprises an imaging assembly configured to capture an image featuring a plurality of items, one or more processors, and a non-transitory computer-readable memory coupled to the imaging assembly and the one or more processors. The memory stores instructions thereon that, when executed by the one or more processors, cause the one or more processors to: detect at least one first item and at least one label present in a captured image; associate the at least one first item with the at least one label based on a boundary between the at least one first item and at least one second item different from the at least one first item; identify the at least one first item based on at least one attribute of the at least one first item; determine an area indicative of a position of the identified at least one first item based on the association; and generate a planogram based on the association, the identified at least one first item and the area.

In an embodiment, the present disclosure is directed to a tangible machine-readable medium comprising instructions for instructions for planogram generation that, when executed, cause a machine to at least: detect at least one first item and at least one label present in a captured image; associate the at least one first item with the at least one label based on a boundary between the at least one first item and at least one second item different from the at least one first item; identify the at least one first item based on at least one attribute of the at least one first item; determine an area indicative of a position of the identified at least one first item based on the association; and generate a planogram based on the association, the identified at least one first item and the area.

Figure 1:
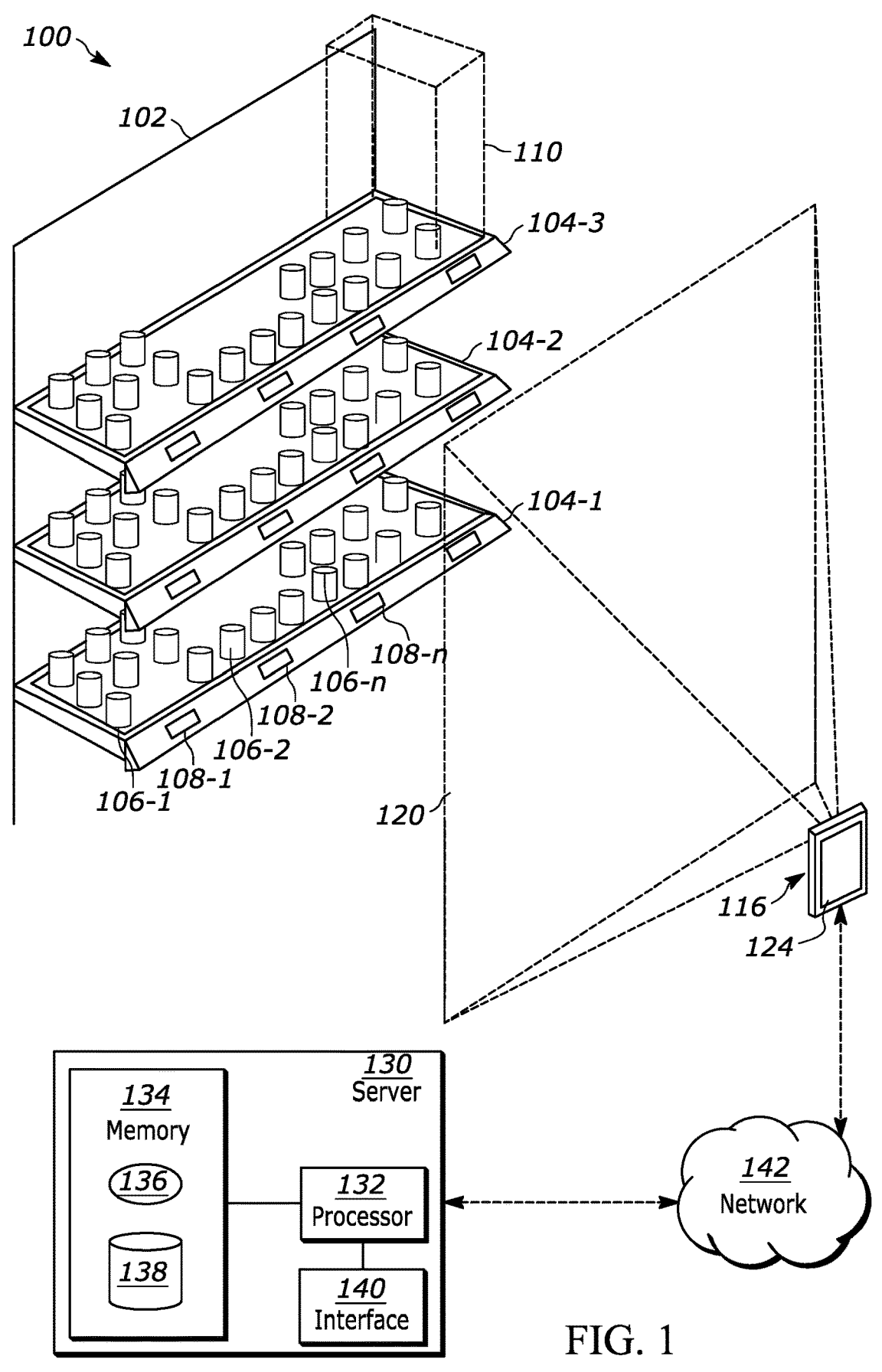

Turning to the Drawings, FIG. 1 is a diagram 100 illustrating an embodiment of a system of the present disclosure. FIG. 1 illustrates a system for dynamic planogram generation. The system can be deployed in a facility (e.g., a grocery store, convenience store, big box store, etc.). For example, the system can be deployed in a customer-accessible portion of the facility that may be referred to as the front of the facility.

Items received at the facility, e.g. via a receiving bay or the like, are generally placed on support structures such as shelves in the stock room, until restocking of the relevant items is required in the front of the facility. An associate can retrieve the items requiring restocking from the back room, and transport those items to the appropriate locations in the front of the facility. Locations for items in the front of the facility are typically predetermined, e.g. according to a planogram that specifies, for each portion of shelving or other support structures, which items are to be placed on such structures. The planogram can be accessed from a mobile device operated by the associate, kept on a printed sheet or the like.

As mentioned above, a facility planogram is generally generated by a central entity (e.g., corporate headquarters). Therefore, a planogram is generally not facility-specific. For example, the planogram may not reflect customer data (e.g., preferences and trends) and/or facility data (e.g., item returns, inventory, sales, etc.) and a facility may not have the required space (e.g., shelving) to accommodate each item listed on the planogram. As such, an associate may be required to generate a new planogram or modify an existing planogram to reflect customer data and/or facility data and/or accommodate each item. For example, if a planogram does not accommodate an item, an associate can generate a new planogram or modify an existing planogram to include an area of the shelving associated with the item. The system provides for generating and/or modifying a planogram based on an association between at least one first item and at least one label, an identification (e.g., a SKU and/or product code such as a UPC) of the at least one first item, and an area indicative of a position of the identified at least one first item.

As shown in FIG. 1, the facility includes at least one support structure such as a display module 102 with one or more support surfaces 104-1, 104-2, and 104-3 (collectively referred to as support surfaces 104, and generically referred to as support surface 104) carrying items 106-1, 106-2, and

106-*n* (collectively referred to as items 106, and generically referred to as item 106). The items 106 may be of different types such that item 106-1 is different from items 106-2 and 106-*n*, item 106-2 is different from item 106-*n*, etc. In addition, an item 106 can comprise one or more items. For example, item 106-1 comprises a group of eight items 106-1 and item 106-2 comprises a group of three items 106-2. Items 106-1, 106-2 and 106-3 can be respectively identified by item labels 108-1, 108-2 and 108-*n* (collectively referred to as labels 108, and generically referred to as label 108). For example, the label 108 can be a SKU and/or product code (e.g. a UPC) or the like. A planogram can specify an item area 110 (e.g., of a support surface 104) indicative of a position of an item 106. An item area 110 can be determined relative to an alignment of a label 108 (e.g., left, right or center-aligned). As described in further detail below, this can be problematic because these alignments can be inconsistent across a display module 102. For example, one item area 110 can be left aligned with one label 108 while another item area 110 can be center aligned with another label 108.

The system can include a mobile computing device 116, such as a smart phone, a tablet computer, or the like. The device 116 can be operated by an associate at the facility, and includes an imaging assembly (e.g., a camera) having a field of view (FOV) 120 and a display 124. The device 116 can be manipulated such that the imaging assembly can view at least a portion of the display module 102 within the FOV, and can be configured to capture an image or a stream of images of the display module 102. From such images, the device 116 can detect at least one item 106 and at least one label 108. The device 116 can also extract at least one attribute (e.g., a feature) of an item 106 including, but not limited to, a shape, color, pattern, logo, size, width, length, and height of an item 106.

Certain components of a server 130 are also illustrated in FIG. 1. The server 130 can include a processor 132 (e.g. one or more central processing units (CPUs)), interconnected with a non-transitory computer readable storage medium, such as a memory 134 and an interface 140. The memory 134 includes a combination of volatile memory (e.g. Random Access Memory or RAM) and non-volatile memory (e.g. read only memory or ROM, Electrically Erasable Programmable Read Only Memory or EEPROM, flash memory). The processor 132 and the memory 134 each comprise one or more integrated circuits.

The memory 134 stores computer readable instructions for execution by the processor 132. The memory 134 stores a planogram generation application 136 (also referred to simply as the application 136) which, when executed by the processor 132, configures the processor 132 to perform various functions described below in greater detail and related to detecting at least one item 106 and at least one label 108, associating the at least one item 106 with the at least one label 108, identifying the at least one item 106, determining an area indicative of a position of the identified at least one item 106, and generating a planogram based on the association, the identified at least one item 106 and the determined area. As described below, this functionality can also be executed by the processor 202 of the device 116.

The application 136 may also be implemented as a suite of distinct applications in other examples. Those skilled in the art will appreciate that the functionality implemented by the processor 132 via the execution of the application 136 may also be implemented by one or more specially designed hardware and firmware components, such as field-programmable gate arrays (FPGAs), application-specific integrated circuits (ASICs) and the like in other embodiments. The memory 134 also stores a repository 138 including one or more image datasets of a plurality of items 106.

The server 130 also includes a communications interface 140 enabling the server 130 to communicate with other computing devices, including the device 116, via the network 142. The communications interface 140 includes suitable hardware elements (e.g. transceivers, ports and the like) and corresponding firmware according to the communications technology employed by the network 142.

FIG. 2 is a diagram 200 illustrating components of the computing device 116 of FIG. 1. The device 116 includes a processor 202 (e.g. one or more CPUs), interconnected with a non-transitory computer readable storage medium, such as a memory 204, an input 206, a display 124, an imaging assembly 210, and an interface 212. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 202 and the memory 204 each comprise one or more integrated circuits.

The at least one input 206 can be a device interconnected with the processor 202. The input device 206 is configured to receive an input (e.g. from an operator of the device 116) and provide data representative of the received input to the processor 202. The input device 206 can include any one of, or a suitable combination of, a touch screen integrated with the display 208, a keypad, a microphone, a barcode scanner and the like. For example, an operator can utilize the barcode scanner to scan a label 108.

The imaging assembly 210 (e.g., a camera) includes a suitable image sensor or combination of image sensors. The camera 210 is configured to capture one or more images for provision to the processor 202 and subsequent processing to detect at least one item 106 and at least one label 108, associate the at least one item 106 with the at least one label 108, identify the at least one item 106, determine an area indicative of a position of the identified at least one item 106, and generate a planogram based on the association, the identified at least one item 106 and the area. As such, the camera 210 need not be a high-resolution camera or a system of high-resolution cameras to decode a label 108 from a captured image because the processor 202 can associate the at least one item 106 with the at least one label 108 and identify the at least one item 106 based on at least one attribute thereof to procure a label 108 (e.g., an identifier such as a SKU or UPC) of the item 106.

In addition to the display 124, the device 116 can also include one or more other output devices, such as a speaker, a notification light-emitting diode (LED), and the like (not shown). The communications interface 212 enables the device 116 to communicate with other computing devices, such as the server 130, via the network 142. The interface 212 therefore includes a suitable combination of hardware elements (e.g. transceivers, antenna elements and the like) and accompanying firmware to enable such communication.

The memory 204 stores computer readable instructions for execution by the processor 202. In particular, the memory 204 stores a planogram generation application 214 (also referred to simply as the application 214) which, when executed by the processor 202, configures the processor 202 to perform various functions discussed below in greater detail and related to detecting at least one item 106 and at least one label 108, associating the at least one item 106 with the at least one label 108, identifying the at least one item 106, determining an area indicative of a position of the identified at least one item 106, and generating a planogram based on the association, the identified at least one item 106 and the area. The application 214 may also be implemented as a suite of distinct applications in other examples. Those skilled in the art will appreciate that the functionality implemented by the processor 202 via the execution of the application 214 may also be implemented by one or more specially designed hardware and firmware components, such as FPGAs, ASICs and the like in other embodiments. As noted above, in some examples the memory 204 can also store the repository 138, rather than the repository 138 being stored at the server 130.

Figure 3:
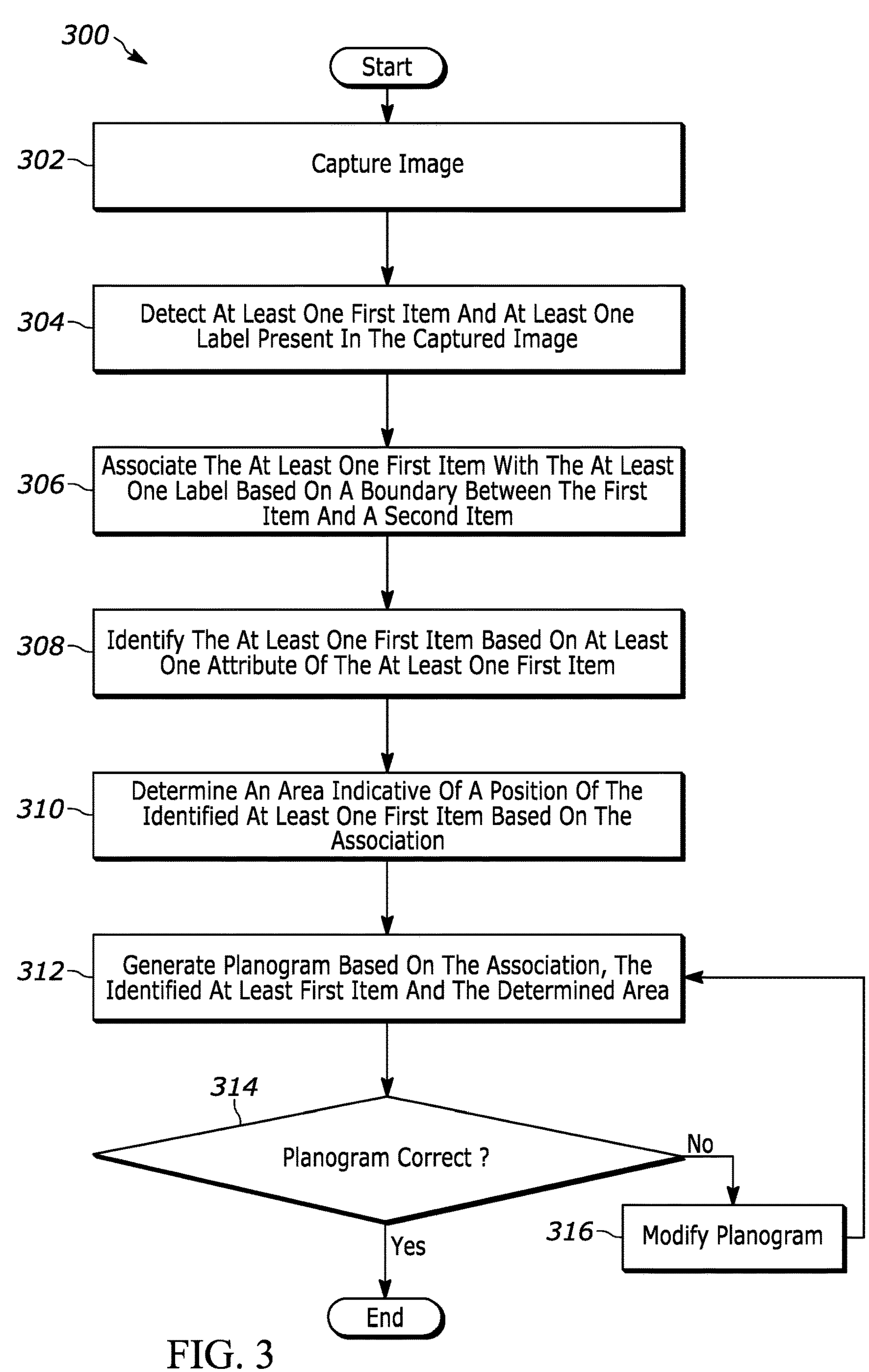
FIG. 3 is a flowchart illustrating processing steps carried out by an embodiment of the present disclosure.

FIG. 3 is a flowchart 300 illustrating processing steps carried out by an embodiment of the present disclosure. The processing steps will be described in conjunction with their performance in the system (e.g., by the computing device 116 or the server 130 in conjunction with the computing device 116). In general, via performance of the processing steps, the system can automatically and dynamically generate a planogram. For example, the system can automatically and dynamically detect at least one item 106 and at least one label 108, associate the at least one item 106 with the at least one label 108, identify the at least one item 106, determine an area indicative of a position of the identified at least one item 106, and generate a planogram based on the association, the identified at least one item 106 and the area.

Figure 4A:
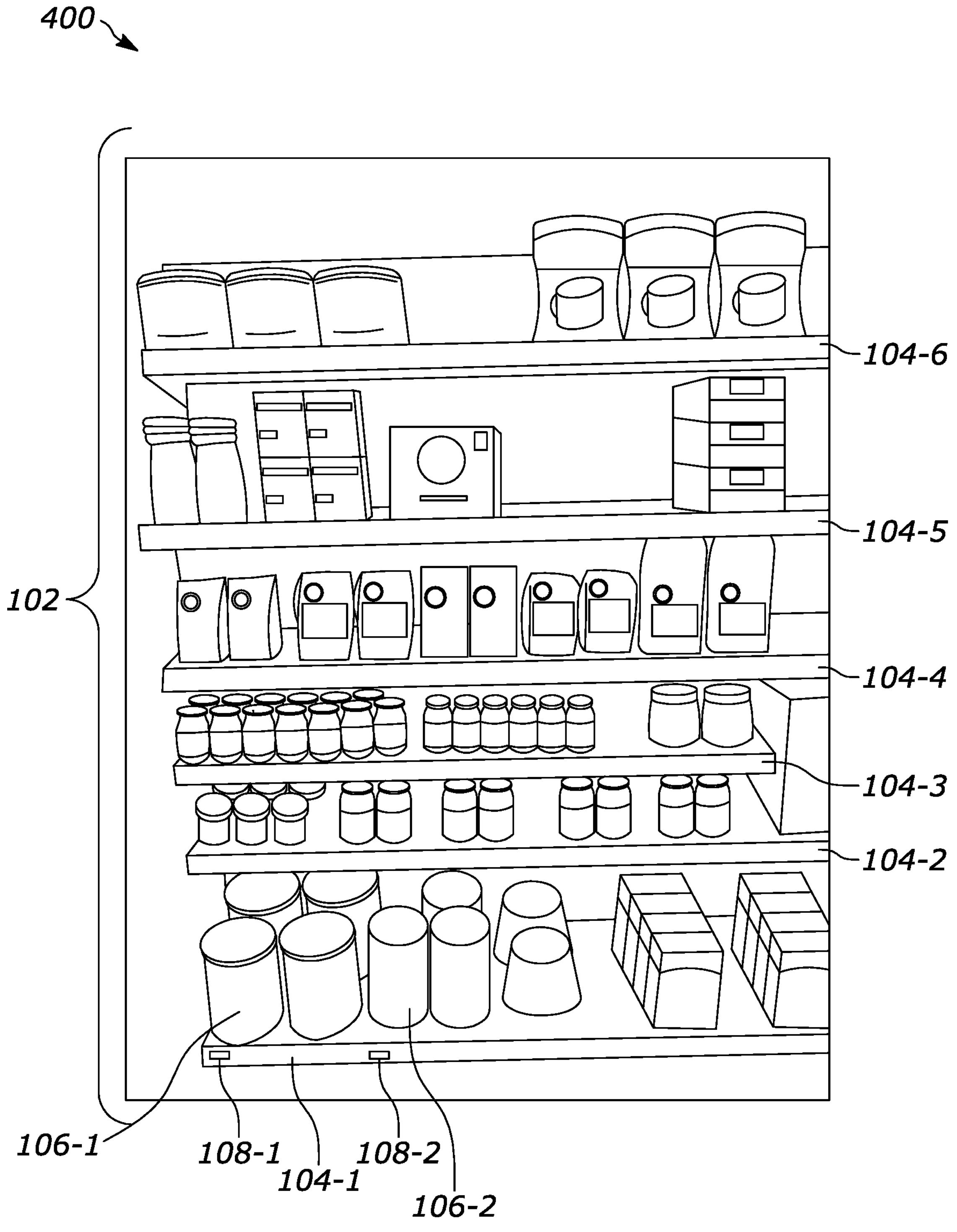
FIGS. 4A-B are diagrams respectively illustrating object detection carried out by an embodiment of the present disclosure.
Figure 4B:
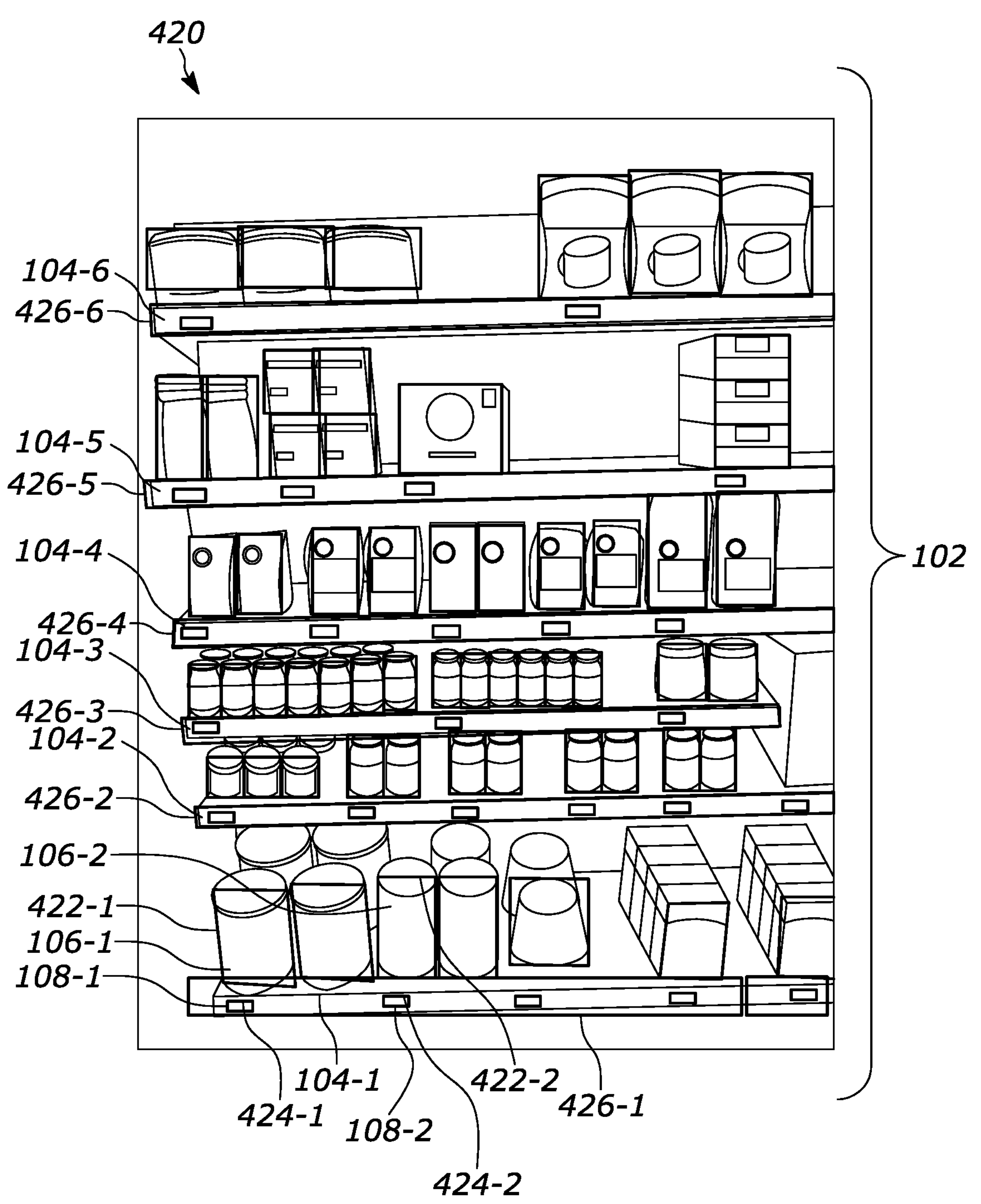

Beginning in step 302, the system captures an image of a display module 102. For example, the system can capture an image via the camera 210 of the device 116 by manipulating the camera 210 such that a FOV of the camera 210 includes at least a portion of the display module 102 including at least one item 106 and at least one label 108. In step 304, the system detects at least one item 106 and at least one label 108 present in the captured image. The system can also detect one or more support surfaces 104 and/or features thereof (e.g., an edge of a support surface 104). For example, the system can utilize a deep neural network (DNN) to detect and localize one or more of a support surface 104, an item 106, and a label 108 via a plurality of boundary boxes. As described in further detail below, FIGS. 4A-B are diagrams respectively illustrating object detection to localize one or more of a support surface 104, an item 106 and a label 108.

Figure 5:
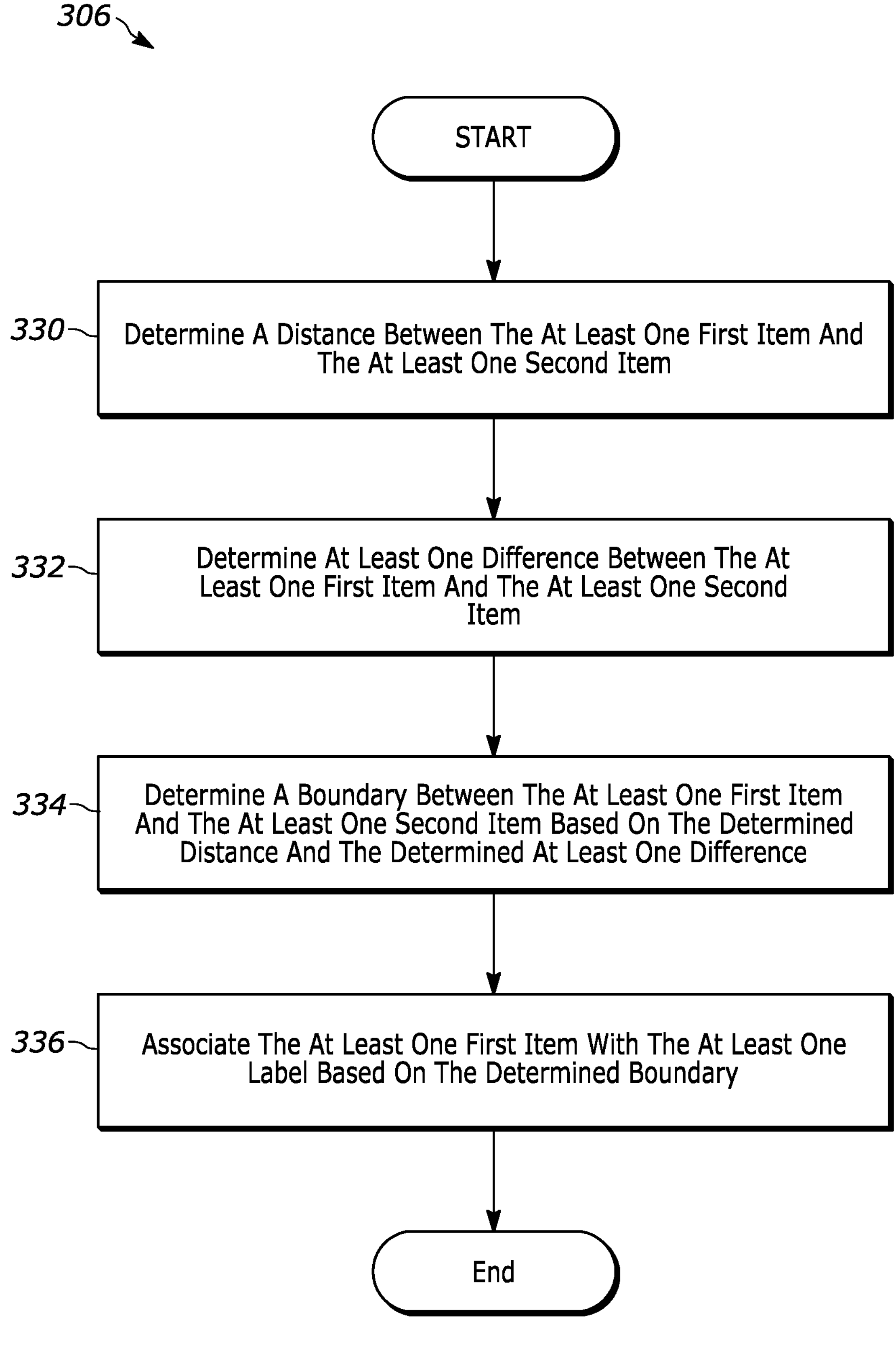
FIG. 5 is a flowchart illustrating step 306 of FIG. 3 in greater detail.
Figure 6A:
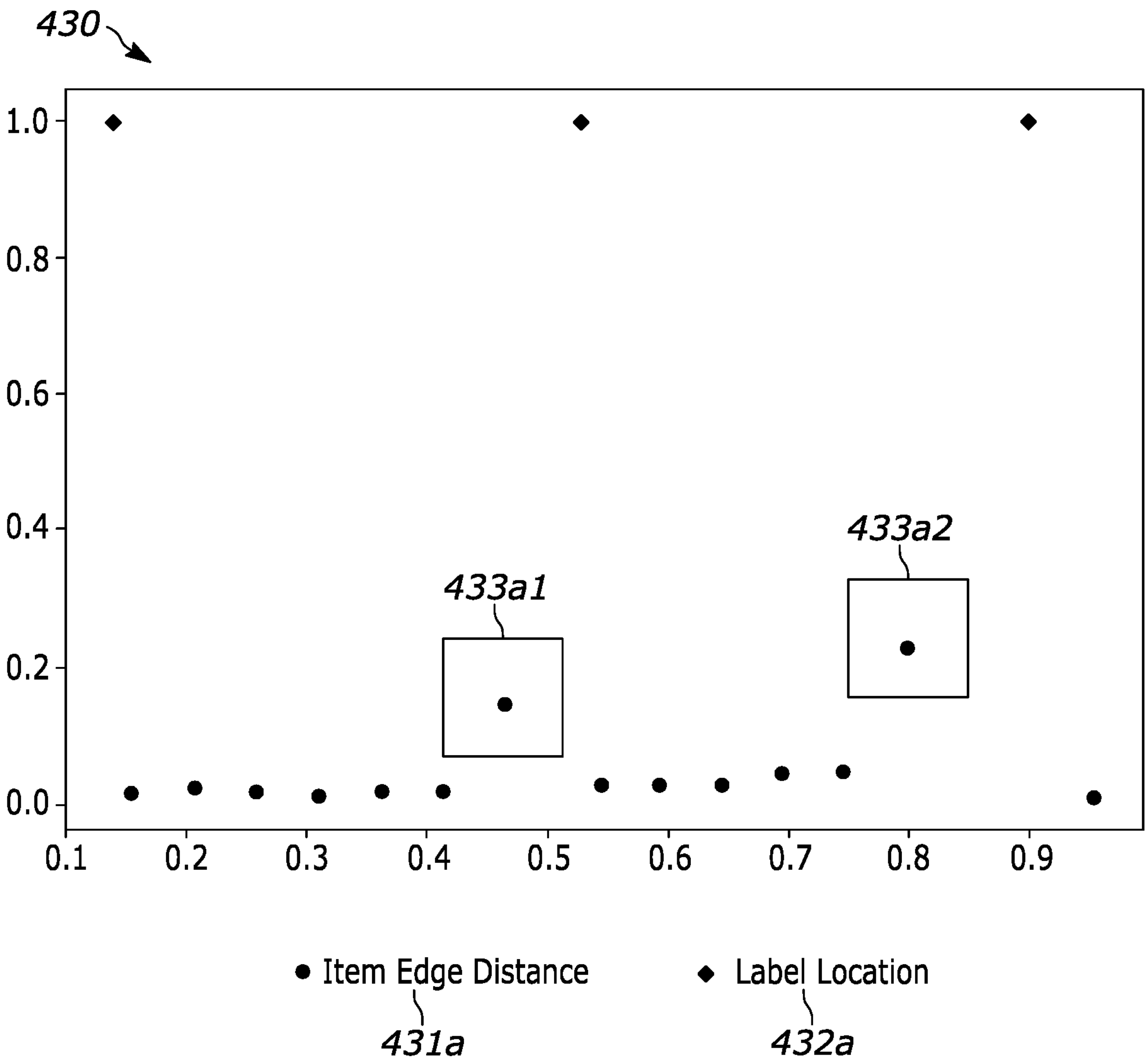
FIGS. 6A-C are graphs illustrating item and label association carried out by an embodiment of the present disclosure.
Figure 6B:
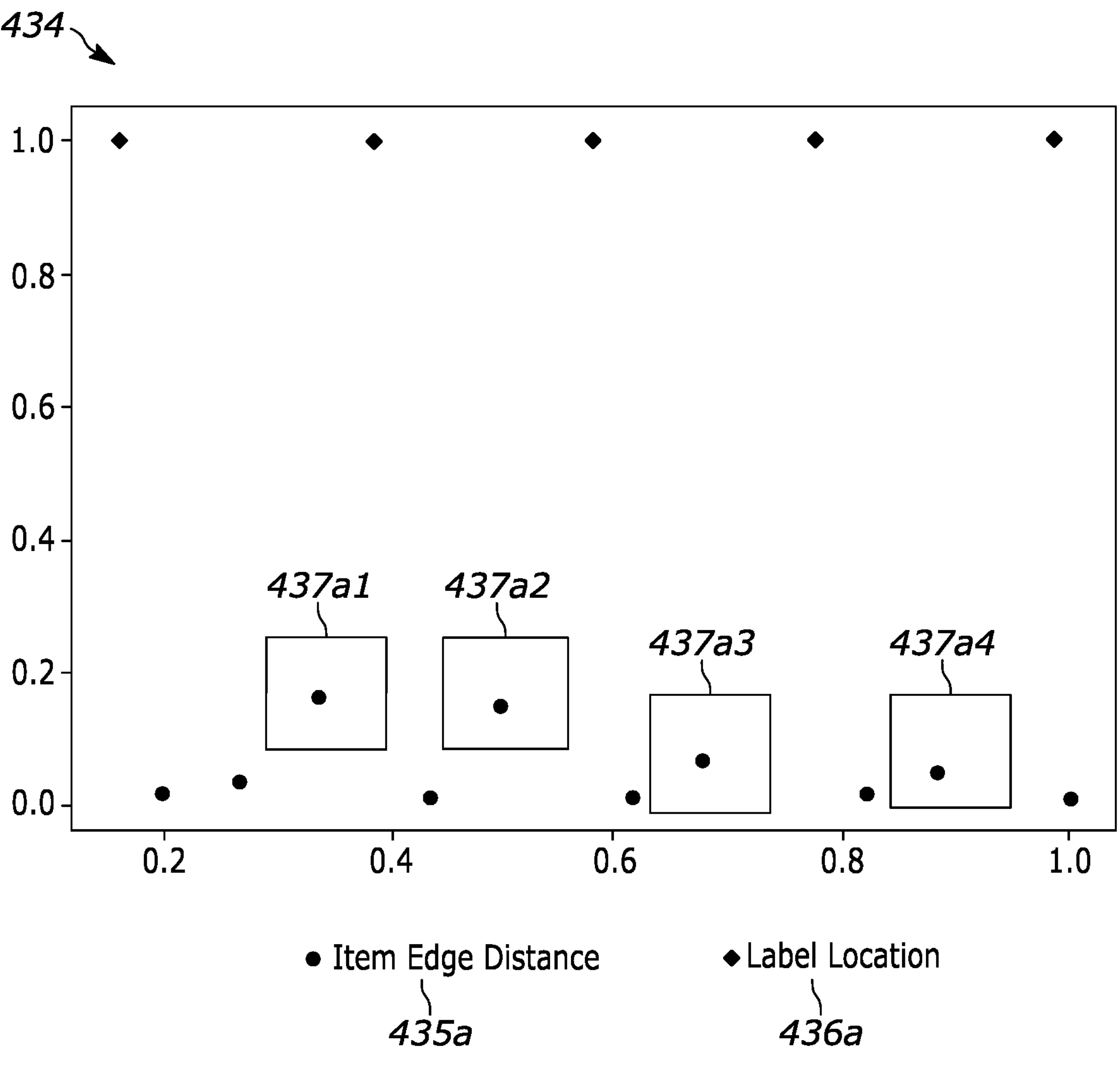
Figure 6C:
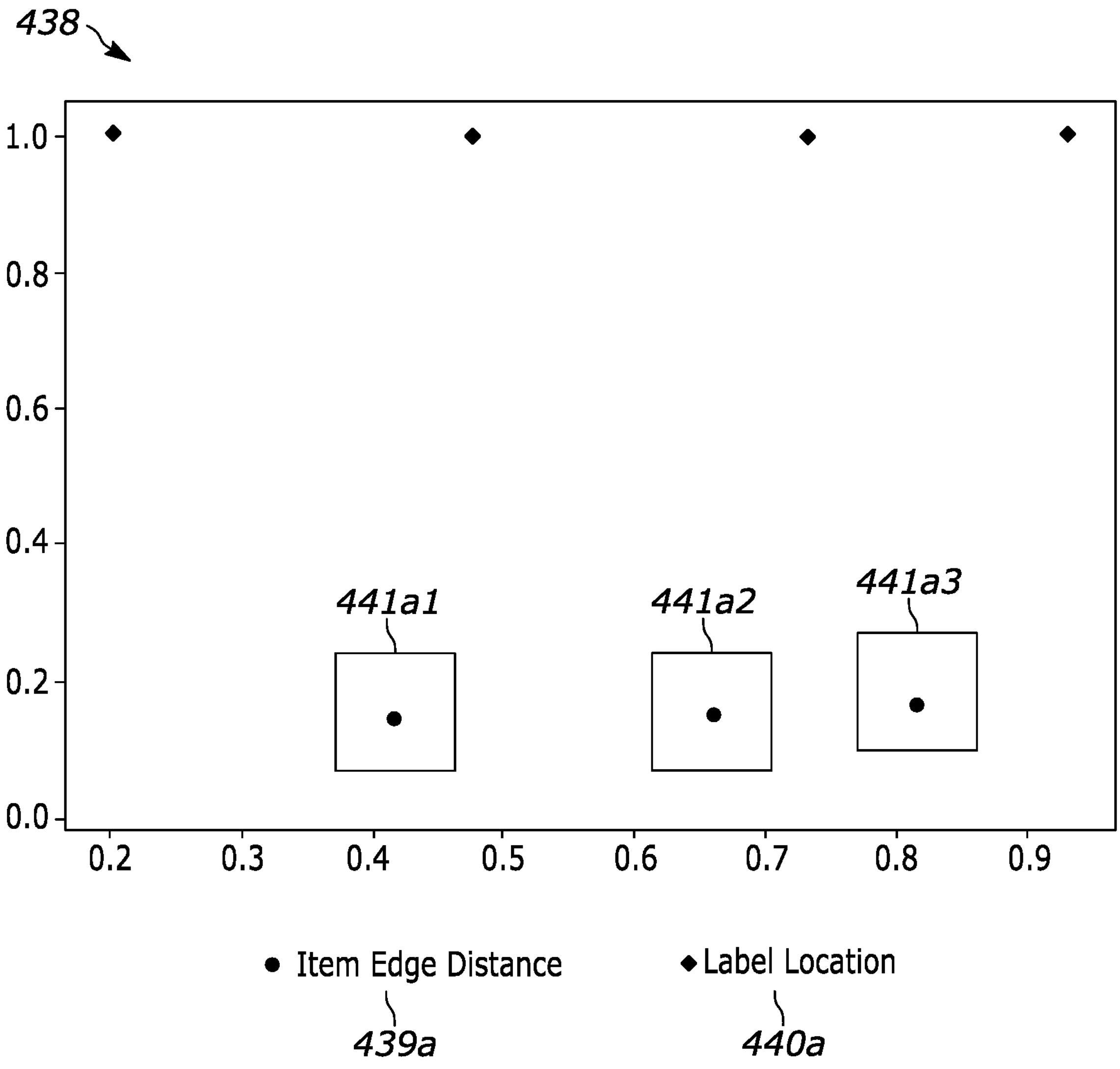
Figure 7:
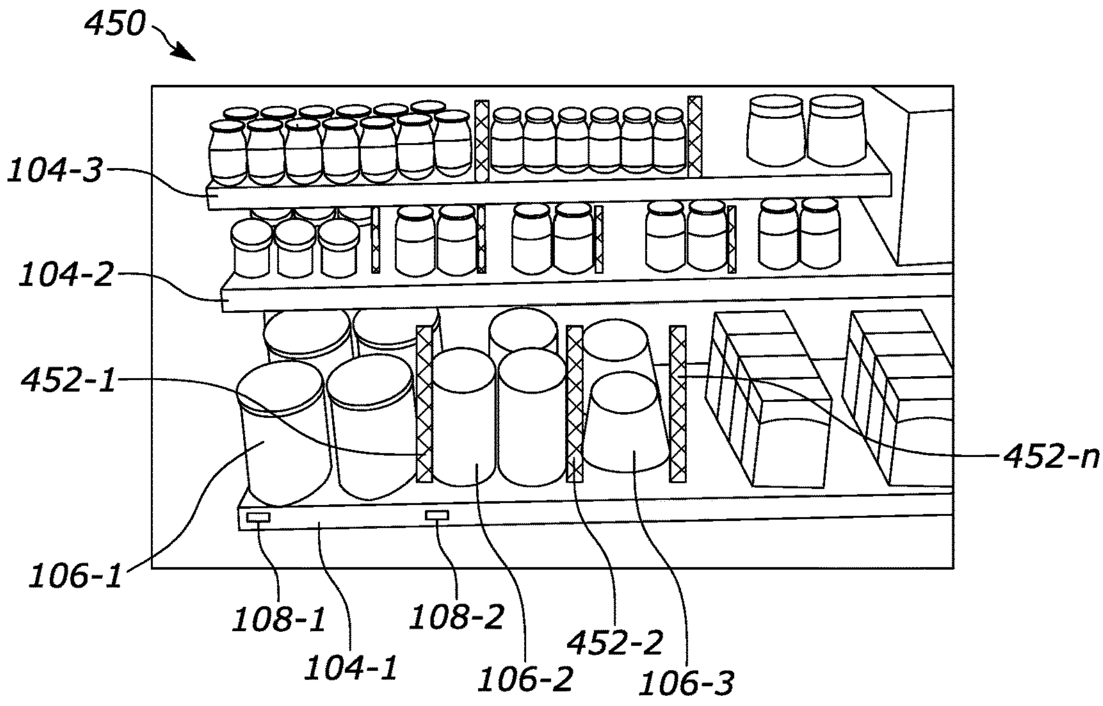
FIG. 7 is a diagram illustrating step 334 of FIG. 5.
Figure 8:
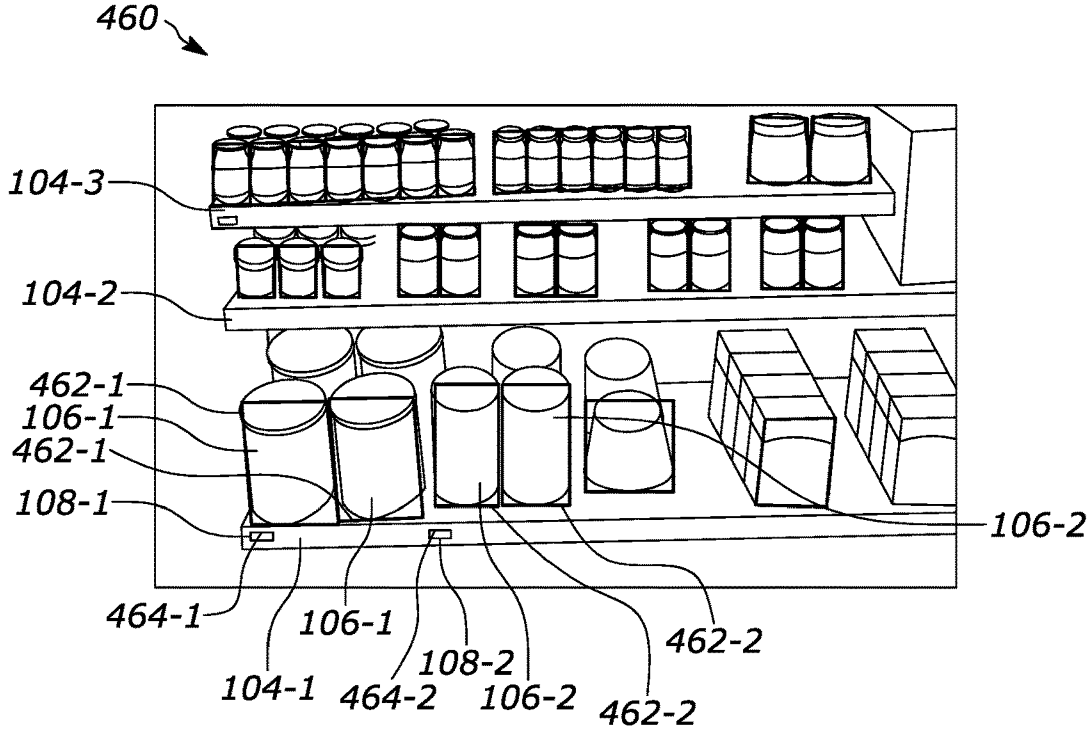
FIG. 8 is a diagram illustrating item and label association carried out by an embodiment of the present disclosure.

In step 306, the system associates the at least one item 106 with the at least one label 108 based on a boundary between the at least one item 106 (e.g., a first item 106-1) and another item 106 (e.g., a second item 106-2) that is different from the at least one first item 106-1. As described in further detail below, FIG. 5 is a flowchart illustrating step 306 of FIG. 3 in greater detail. Additionally, FIGS. 6A-C are graphs illustrating item and label association carried out by an embodiment of the present disclosure and FIGS. 7 and 8 are diagrams respectively illustrating steps 334 and 336 of FIG. 5.

Figure 9:
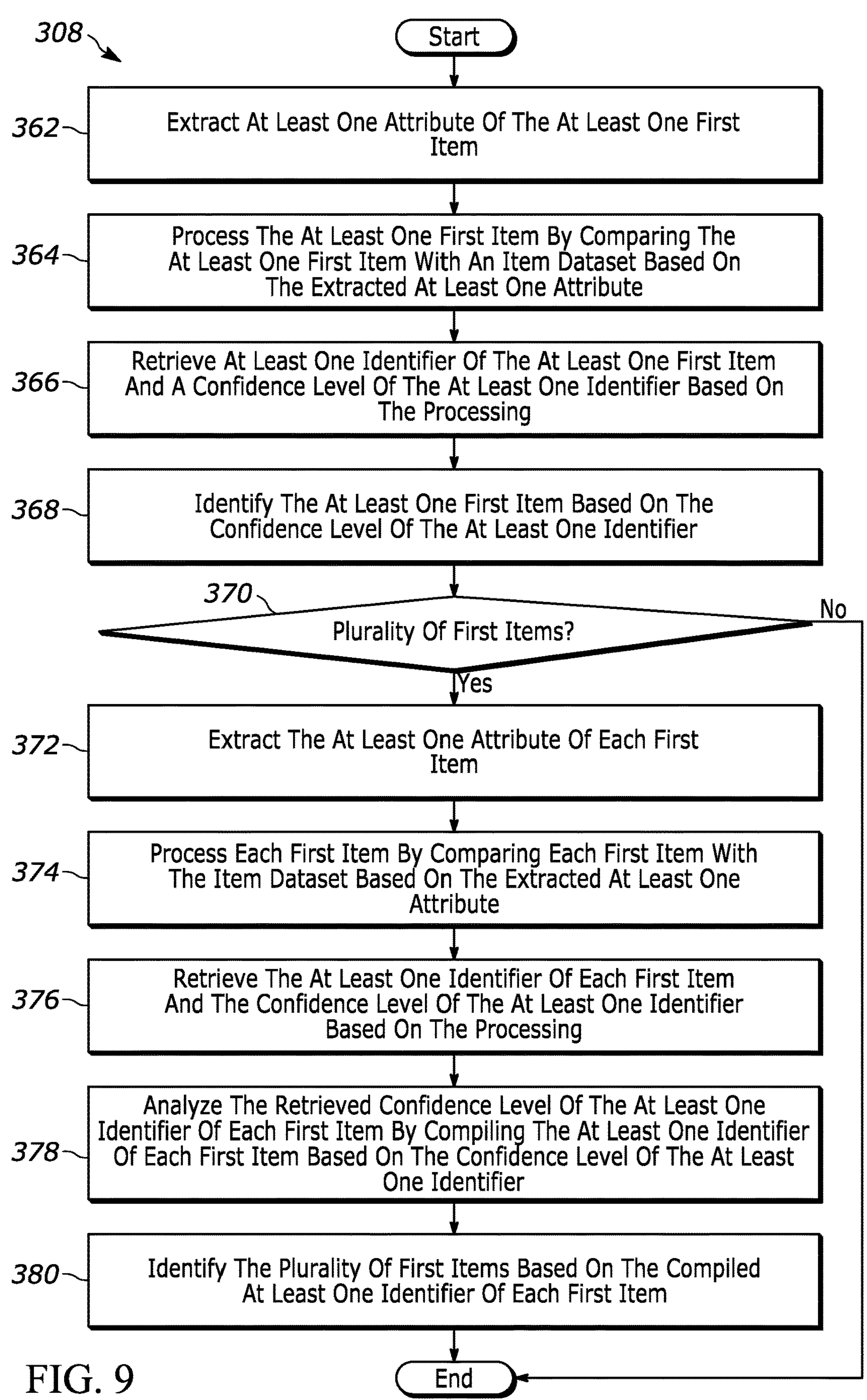
FIG. 9 is a flowchart illustrating step 308 of FIG. 3 in greater detail.
Figure 10:
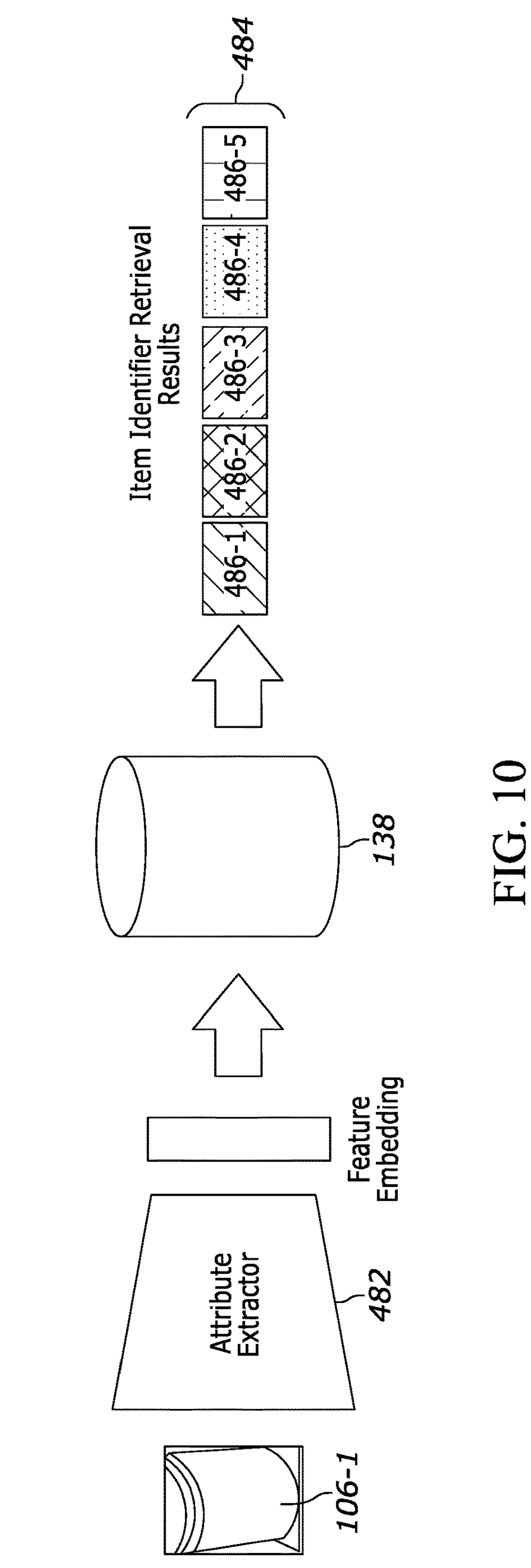
FIG. 10 is a diagram illustrating item identification carried out by an embodiment of the present disclosure.
Figure 11:
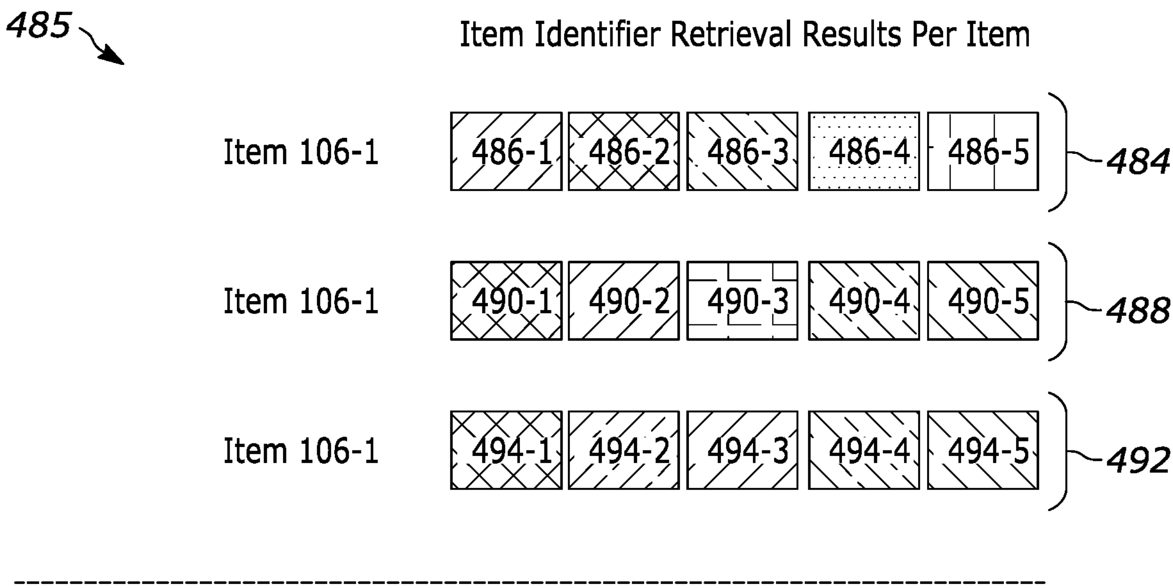
FIG. 11 is a diagram illustrating item identification carried out by an embodiment of the present disclosure.

Then, in step 308, the system identifies the at least one item 106 based on at least one attribute (e.g., a feature) of the at least one item 106. For example, the system can utilize a DNN to detect and extract at least one attribute of the at least one item 106 including, but not limited to, a shape, color, pattern, logo, size, width, length, and height of the at least one item 106. As described in further detail below, FIG. 9 is a flowchart illustrating step 308 of FIG. 3 in greater detail. Additionally, FIGS. 10 and 11 are diagrams respectively illustrating item identification carried out by embodiments of the present disclosure.

In step 310, the system determines an area indicative of a position (e.g., on a support surface 104) of the identified at least one item 106 based on the association. The area can be one or more of an aisle, a module, a shelf, a rack, a bay, and a bin. Then, in step 312, the system generates a planogram (e.g., a diagram or a table) based on the association, the identified at least one item 106 and the determined area. The generated planogram can be displayed on the display 124 of the device 116 (e.g., via a user interface). In step 314, the system determines whether the planogram is correct. For example, an associate can confirm whether the displayed planogram on the display 124 is correct. If the system determines the planogram is correct, an associate can transmit the planogram in real-time to a central entity (e.g., corporate headquarters) to optimize the generation of a facility-specific planogram and/or the process ends. Alternatively, if the system determines the planogram is not correct, then the process proceeds to step 316. In step 316, the system modifies the planogram. For example, an associate can select and modify one or more incorrectly classified labels 108 via an input 206 (e.g., a touchscreen and/or barcode scanner) of the device 116. The process then returns to step 312.

FIGS. 4A-B are diagrams respectively illustrating object detection carried out by an embodiment of the present disclosure. FIG. 4A is a diagram 400 illustrating a display module 102 and FIG. 4B is a diagram 420 illustrating object detection of the display module 102 carried out by an embodiment of the present disclosure. As shown in FIG. 4A, the display module 102 includes support surfaces 104-1, 104-2, 104-3, 104-4, 104-5, and 104-6 on which items 106 are positioned thereon and labels 108 are affixed thereto (e.g., on respective edges of the support surfaces 104-1, 104-2, 104-3, 104-4, 104-5, and 104-6). For example, first items 106-1 and second items 106-2 are positioned on the support surface 104-1 and labels 108-1 and 108-2 are affixed to an edge of the support surface 104-1. As mentioned above, the system can utilize a DNN to detect and localize one or more of a support surface 104, an item 106, and a label 108 via a plurality of boundary boxes. As shown in FIG. 4B, the display module 102 includes a plurality of boundary boxes associated with the support surfaces 104, items 106 and labels 108. For example, boundary boxes 422-1 and 422-2 are respectively associated with first and second items 106-1 and 106-2, boundary boxes 424-1 and 424-2 are respectively associated with labels 108-1 and 108-2 and boundary box 426-1 is associated with support surface 104-1.

FIG. 5 is a flowchart illustrating step 306 of FIG. 3 in greater detail. As mentioned above, a planogram can specify an item area 110 (e.g., of a support surface 104) indicative of a position of an item 106. An item area 110 can be determined relative to an alignment of a label 108 (e.g., left, right or center-aligned). This can be problematic because these alignments can be inconsistent across a display module 102. For example, one item area 110 can be left aligned with one label 108 while another item area 110 can be center aligned with another label 108. To address this, the system associates at least one item 106 (e.g., a first item 106-1) with at least one label 108 based on a boundary between the at least one first item 106-1 and another item 106 (e.g., a second item 106-2) that is different from the at least one first item 106-1.

Beginning in step 330, the system determines a distance between the at least one first item 106-1 and the at least one second item 106-2. The distance can be indicative of a void or gap between a position of the at least one first item 106-1 and a position of the at least one second item 106-2. For example, the distance can be a lateral distance between a position of the at least one first item 106-1 and a position of the at least one second item 106-2. In step 332, the system determines at least one difference between the at least one first item 106-1 and the at least one second item 106-2. For example, the at least one difference can be one or more of a shape, color, pattern, logo, size, width, length, and height of each of the at least one first item 106-1 and the at least one second item 106-2. Then, in step 334, the system determines a boundary between the at least one first item 106-1 and the at least one second item 106-2. For example, the system can determine a boundary probability (BP) via Equation 1 as follows:

$$BP = w \times \text{positional gap}(\text{item } 1, \text{item } 2) + (1 - w) \times \text{difference}(\text{item } 1, \text{item } 2) \quad \text{Equation 1}$$

where w denotes weight and the weight is set based on a condition. For example, if the system determines there is a wide positional gap between the at least one first item 106-1 and the at least one second item 106-2, then the system can weight the positional gap between a position of the at least one first item 106-1 and a position of the at least one second item 106-2 more than the at least one difference between the at least one first item 106-1 and the at least one second item 106-2. In another example, if the system determines there is a narrow positional gap between the at least one first item 106-1 and the at least one second item 106-2, then the system can weight the at least one difference between the at least one first item 106-1 and the at least one second item 106-2 more than the positional gap between a position of the at least one first item 106-1 and a position of the at least one second item 106-2. In addition, a boundary has a maximum boundary probability point. For example, a boundary of a label 108-1 and a label 108-2 denotes a maximum boundary probability point. In step 336, the system associates the at least one first item 106-1 with at least one label 108 based on the determined boundary.

FIGS. 6A-C are graphs illustrating item and label association carried out by an embodiment of the present disclosure. Graph 430 of FIG. 6A corresponds to support surface 104-3 of FIGS. 4A-B, 7 and 8, graph 434 of FIG. 6B corresponds to support surface 104-2 of FIGS. 4A-B, 7 and 8, and graph 438 of FIG. 6C corresponds to support surface 104-1 of FIGS. 4A-B, 7 and 8.

As shown in FIGS. 6A-C, each point 431*a*, 435*a*, and 439*a* is indicative of a type of item 106 or a group of items 106 of the same type, each point 432*a*, 436*a*, and 440*a* is indicative of a location of a label 108, and each square 433*a*1-2, 437*a*1-4 and 441*a*1-3 is indicative of a difference between types of an item 106 or groups thereof (e.g., a first item 106-1 or group of first items 106-1 and a second item 106-2 or group of second items 106-2). For example, as shown in FIG. 6C, square 441*a*1 is indicative of a difference (e.g., one or more of a shape, color, pattern, logo, size, width, length, and height) between first items 106-1 and second items 106-2 of FIG. 4A-B.

FIG. 7 is a diagram 450 illustrating step 334 of FIG. 5. As shown in FIG. 7, the system can determine a boundary between the first items 106-1 and the second items 106-2. For example, the system can determine a boundary 452-1 between the first items 106-1 and the second items 106-2 based on the determined distance and the determined at least one difference between the first items 106-1 and the second items 106-2. The system can determine a plurality of boundaries 452 (e.g., 452-1, 452-2, and 452-*n*) between items 106 different from one another. For example and as shown in FIG. 7, the system can determine a boundary 452-2 between second items 106-2 and third items 106-3.

FIG. 8 is a diagram 460 illustrating item and label association carried out by an embodiment of the present disclosure. As shown in FIG. 8, the system can associate the first items 106-1 and label 108-1 based on the boundary 452-1 (as shown in FIG. 7) via respective boundary boxes 462-1 and 464-1 of the same type (e.g., the same color, line type, hatching, or the like). The system can also associate the second items 106-2 and label 108-2 based on the boundary 452-2 (as shown in FIG. 7) via respective boundary boxes 462-2 and 464-2 of the same type.

FIG. 9 is a flowchart illustrating step 308 of FIG. 3 in greater detail. Beginning in step 362, the system extracts at least one attribute of at least one first item 106-1. For example, the system can utilize a DNN to detect and extract at least one attribute of the at least one first item 106-1 including, but not limited to, a shape, color, pattern, logo, size, width, length, and height of the at least one first item 106-1. In step 364, the system can process the at least one first item 106-1 by comparing the at least one first item 106-1 and an item dataset based on the extracted at least one attribute. The item dataset can be stored in the repository 138 and can comprise a plurality of images of items 106. The repository 138 can be proprietary (e.g., comprise images captured by a device 116 of items 106 of a facility) and/or can be universal (e.g., comprise images captured from a plurality of sources).

In step 366, the system can retrieve at least one identifier of the at least one first item 106-1 and a confidence level of the at least one identifier based on the processing. The identifier can be a SKU and/or product code (e.g. a UPC) or the like. For example, the system can retrieve a predetermined number (e.g., an integer value such as 1 or 5) of identifiers and associated confidence levels of the at least one first item 106-1. The confidence level of the at least one identifier can include one or more of a percentage, numerical ranking, gradient color scheme or the like. Then, in step 368, the system can identify the at least one first item 106-1 based on the confidence level of the at least one identifier. For example and shown in FIG. 10, the system can identify the at least one first item 106-1 based on a highest confidence level of a retrieved identifier among a plurality of identifiers.

FIG. 10 is a diagram 480 illustrating item identification carried out by an embodiment of the present disclosure. As shown in FIG. 10, the system can extract an attribute of an item 106-1 via an attribute extractor 482 (e.g., a DNN) and process the at least one first item 106-1 by comparing the at least one first item 106-1 and an item dataset of a repository 138 based on the extracted at least one attribute to yield a result 484 indicative of at least one identifier and an associated confidence level of the at least one identifier. For example, the result 484 includes identifiers 486-1, 486-2, 486-3, 486-4 and 486-5 ranked in descending order (from left to right) based on a gradient color scheme where a warmer/lighter color (e.g., yellow) is indicative of a higher confidence level than a cooler/darker color (e.g., blue). As such, the system can identify the at least one first item 106-1 based on the identifier 486-1 since the identifier 486-1 has a highest confidence level among the plurality of identifiers. If the confidence level of the at least one identifier having a highest confidence level is below a threshold, the system can prompt an associate to provide an identifier of the at least one item 106-1.

Returning to FIG. 9, in step 370, the system determines whether there is an additional at least one first item 106-1. If the system determines there is not an additional first item 106-1, then the process ends. Alternatively, if the system determines there is an additional at least one first item 106-1, then the process proceeds to step 372. In step 372, the system extracts at least one attribute of each first item 106-1.

As mentioned above, the system can utilize a DNN to detect and extract at least one attribute of each first item 106-1 including, but not limited to, a shape, color, pattern, logo, size, width, length, and height of each first item 106-1. Then, in step 374, the system can process each first item 106-1 by comparing each first item 106-1 and the item dataset based on the extracted at least one attribute of each first item 106-1. In step 376, the system can retrieve at least one identifier of each first item 106-1 and a confidence level of the at least one identifier based on the processing. The identifier can be a SKU and/or product code (e.g. a UPC) or the like. In step 378, the system can analyze the retrieved confidence level of the at least one identifier of each first item 106-1 by compiling the at least one identifier of each first item 106-1 based on the confidence level of the at least one identifier. In step 380, the system can identify the plurality of first items 106-1 based on the compiled at least one identifier of each first item 106-1. For example and shown in FIG. 11, the system can identify the plurality of first items 106-1 based on a compiled highest confidence level of a retrieved identifier among a plurality of identifiers.

FIG. 11 is a diagram 485 illustrating item identification carried out by an embodiment of the present disclosure. As shown in FIG. 11, the system can analyze a retrieved confidence level of at least one identifier of each first item 106-1 by compiling the at least one identifier of each first item 106-1 based on a confidence level of the at least one identifier. For example and as shown in FIG. 10, the compiled result 496 of item 106-1 is based on a compilation of result 484 (including identifiers 486-1, 486-2, 486-3, 486-4 and 486-5), result 488 (including identifiers 490-1, 490-2, 490-3, 490-4, and 490-5), and result 492 (including identifiers 494-1, 494-2, 494-3, 494-4, and 494-5). The compiled result 496 includes identifiers 498-1, 498-2, 498-3, 498-4, and 498-5 ranked in descending order (from left to right) based on the respective identifiers of results 484, 488 and 492 such that identifier 498-1 of result 496 is indicative of a highest confidence level of a retrieved identifier among the plurality of identifiers. As such, the system can identify the at least one first item 106-1 based on the identifier 498-1. As mentioned above, the system can utilize a gradient color scheme where a warmer/lighter color (e.g., yellow) is indicative of a higher confidence level than a cooler/darker color (e.g., blue). If the confidence level of the at least one identifier having a highest confidence level is below a threshold, the system can prompt an associate to provide an identifier of the at least one item 106-1.

Figure 12:
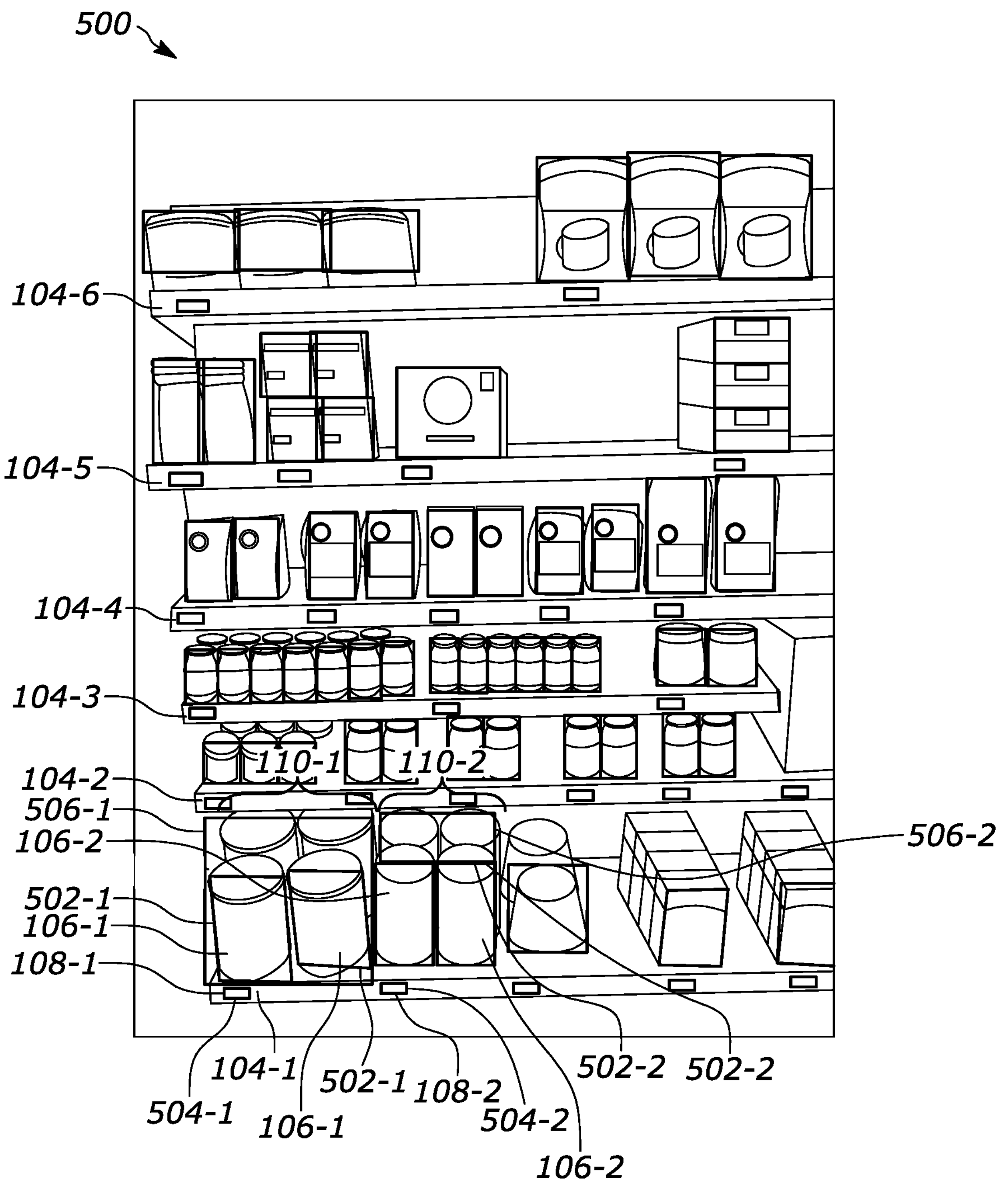
FIG. 12 is a diagram illustrating a planogram generated by an embodiment of the present disclosure.

FIG. 12 is a diagram 500 illustrating a planogram generated by an embodiment of the present disclosure. As shown in FIG. 12, the system can generate a planogram based on an association between an item 106 and a label 108, an identification of an item 106 and a determined item area 110 indicative of a position of the identified item 106. For example and as shown in FIG. 12, the system can associate the first items 106-1, label 108-1 and item area 110-1 via respective boundary boxes 502-1, 504-1 and 506-1 of the same type (e.g., the same color, line type, hatching, or the like). The system can also associate the second items 106-2, label 108-2 and item area 110-2 via respective boundary boxes 502-2, 504-2 and 506-2 of the same type. The generated planogram can be displayed on the display 124 of the device 116 (e.g., via a user interface). An associate can confirm whether the displayed planogram on the display 124 is correct. If the planogram is correct, an associate can transmit the planogram in real-time to a central entity (e.g., corporate headquarters) to optimize the generation of a facility-specific planogram. Alternatively, if the planogram is not correct, an associate can select and modify one or more incorrectly classified labels 108 via an input 206 (e.g., a touchscreen and/or barcode scanner) of the device 116. FIG. 13 is a table 520 illustrating a planogram generated by an embodiment of the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method for planogram generation, comprising:

detecting at least one first item and at least one label present in a captured image;

associating the at least one first item with the at least one label based on a boundary between the at least one first item and at least one second item different from the at least one first item;

utilizing a deep neural network to extract at least one attribute of the at least one first item, and identifying the at least one first item based on the extracted at least one attribute of the at least one first item;

determining an area indicative of a position of the identified at least one first item based on the association; and generating a planogram based on the association, the identified at least one first item and the area, wherein the boundary is determined based on a probability indicative of a conditional weight, a distance between the at least one first item and the at least one second item, and at least one difference between the at least one first item and the at least one second item.

2. The method of claim 1, wherein associating the at least one first item with the at least one label based on the boundary between the at least one first item and the at least one second item different from the at least one first item comprises:

determining the distance between the at least one first item and the at least one second item;

setting the conditional weight based on the determined distance between the at least one first item and the at least one second item;

determining the at least one difference between the at least one first item and the at least one second item;

determining the boundary between the at least one first item and the at least one second item based on the determined distance, the set conditional weight, and the determined at least one difference; and associating the at least one first item with the at least one label based on the determined boundary.

3. The method of claim 1, wherein utilizing the deep neural network to extract the at least one attribute of the at least one first item, and identifying the at least one first item based on the extracted at least one attribute of the at least one first item comprises:

processing the at least one first item by comparing the at least one first item and an item dataset based on the extracted at least one attribute;

retrieving at least one identifier of the at least one first item and a confidence level of the at least one identifier based on the processing; and identifying the at least one first item based on the confidence level of the at least one identifier.

4. The method of claim 3, further comprising:

extracting the at least one attribute of each first item;

processing each first item by comparing each first item with the item dataset based on the extracted at least one attribute;

retrieving the at least one identifier of each first item and the confidence level of the at least one identifier based on the processing;

analyzing the retrieved confidence level of the at least one identifier of each first item by compiling the at least one identifier of each first item based on the confidence level of the at least one identifier; and identifying the plurality of first items based on the compiled at least one identifier of each first item.

5. The method of claim 4, wherein the at least one identifier is one or more of a stock keeping unit (SKU) and a Universal Product Code (UPC).

6. The method of claim 1, further comprising displaying, on a user interface, the generated planogram for a user; and transmitting the planogram.

7. The method of claim 1, wherein the area is one or more of an aisle, a module, a shelf, a rack, a bay, and a bin, and the at least one attribute is one or more of a shape, color, pattern, logo, size, width, length, and height of the at least one item.

8. A device for planogram generation, comprising, an imaging assembly configured to capture an image featuring a plurality of items; one or more processors; and a non-transitory computer-readable memory coupled to the imaging assembly and the one or more processors, the memory storing instructions thereon that, when executed by the one or more processors, cause the one or more processors to:

detect at least one first item and at least one label present in a captured image;

associate the at least one first item with the at least one label based on a boundary between the at least one first item and at least one second item different from the at least one first item;

utilize a deep neural network to extract at least one attribute of the at least one first item, and identify the at least one first item based on the extracted at least one attribute of the at least one first item;

determine an area indicative of a position of the identified at least one first item based on the association; and generate a planogram based on the association, the identified at least one first item and the area, wherein the boundary is determined based on a probability indicative of a conditional weight, a distance between the at least one first item and the at least one second item, and at least one difference between the at least one first item and the at least one second item.

9. The device of claim 8, wherein the instructions, when executed, cause the one or more processors to associate the at least one first item with the at least one label based on the boundary between the at least one first item and the at least one second item different from the at least one first item by:

determining the distance between the at least one first item and the at least one second item;

setting the conditional weight based on the determined distance between the at least one first item and the at least one second item;

determining the at least one difference between the at least one first item and the at least one second item;

determining the boundary between the at least one first item and the at least one second item based on the determined distance, the set conditional weight, and the determined at least one difference; and associating the at least one first item with the at least one label based on the determined boundary.

10. The device of claim 8, wherein the instructions, when executed, cause the one or more processors to utilize the deep neural network to extract the at least one attribute of the at least one first item, and identify the at least one first item based on the extracted at least one attribute of the at least one first item by:

processing the at least one first item by comparing the at least one first item and an item dataset based on the extracted at least one attribute;

retrieving at least one identifier of the at least one first item and a confidence level of the at least one identifier based on the processing; and identifying the at least one first item based on the confidence level of the at least one identifier.

11. The device of claim 10, wherein the instructions, when executed, further cause the one or more processors to:

extract the at least one attribute of each first item;

process each first item by comparing each first item with the item dataset based on the extracted at least one attribute;

retrieve the at least one identifier of each first item and the confidence level of the at least one identifier based on the processing;

analyze the retrieved confidence level of the at least one identifier of each first item by compiling the at least one identifier of each first item based on the confidence level of the at least one identifier; and identify the plurality of first items based on the compiled at least one identifier of each first item.

12. The device of claim 11, wherein the at least one identifier is one or more of a stock keeping unit (SKU) and a Universal Product Code (UPC).

13. The device of claim 8, wherein the instructions, when executed, further cause the one or more processors to:

display, on a user interface, the generated planogram for a user; and transmit the planogram.

14. The device of claim 8, wherein the area is one or more of an aisle, a module, a shelf, a rack, a bay, and a bin, and the at least one attribute is one or more of a shape, color, pattern, logo, size, width, length, and height of the at least one item.

15. A non-transitory computer readable storage medium comprising instructions for planogram generation that, when executed, cause a machine to at least:

detect at least one first item and at least one label present in a captured image;

associate the at least one first item with the at least one label based on a boundary between the at least one first item and at least one second item different from the at least one first item;

utilize a deep neural network to extract at least one attribute of the at least one first item, and identify the at least one first item based on the extracted at least one attribute of the at least one first item;

determine an area indicative of a position of the identified at least one first item based on the association; and generate a planogram based on the association, the identified at least one first item and the area, wherein the boundary is determined based on a probability indicative of a conditional weight, a distance between the at least one first item and the at least one second item, and at least one difference between the at least one first item and the at least one second item.

16. The non-transitory computer readable storage medium of claim 15, wherein the instructions, when executed, cause the machine to associate the at least one first item with the at least one label based on the boundary between the at least one first item and the at least one second item different from the at least one first item by:

determining the distance between the at least one first item and the at least one second item;

setting the conditional weight based on the determined distance between the at least one first item and the at least one second item;

determining the at least one difference between the at least one first item and the at least one second item;

determining the boundary between the at least one first item and the at least one second item based on the determined distance, the set conditional weight, and the determined at least one difference; and associating the at least one first item with the at least one label based on the determined boundary.

17. The non-transitory computer readable storage medium of claim 15, wherein the instructions, when executed, cause the machine to utilize the deep neural network to extract the at least one attribute of the at least one first item, and identify the at least one first item based on the extracted at least one attribute of the at least one first item by:

processing the at least one first item by comparing the at least one first item and an item dataset based on the extracted at least one attribute;

retrieving at least one identifier of the at least one first item and a confidence level of the at least one identifier based on the processing; and identifying the at least one first item based on the confidence level of the at least one identifier.

18. The non-transitory computer readable storage medium of claim 17, wherein the instructions, when executed, further cause the machine to:

extract the at least one attribute of each first item;

process each first item by comparing each first item with the item dataset based on the extracted at least one attribute;

retrieve the at least one identifier of each first item and the confidence level of the at least one identifier based on the processing;

analyze the retrieved confidence level of the at least one identifier of each first item by compiling the at least one identifier of each first item based on the confidence level of the at least one identifier; and identify the plurality of first items based on the compiled at least one identifier of each first item.

19. The non-transitory computer readable storage medium of claim 18, wherein the at least one identifier is one or more of a stock keeping unit (SKU) and a Universal Product Code (UPC).

20. The non-transitory computer readable storage medium of claim 15, wherein the instructions, when executed, further cause the machine to:

display, on a user interface, the generated planogram for a user; and transmit the generated planogram.

21. The non-transitory computer readable storage medium of claim 15, wherein the area is one or more of an aisle, a module, a shelf, a rack, a bay, and a bin, and the at least one attribute is one or more of a shape, color, pattern, logo, size, width, length, and height of the at least one item.

* * * * *